United States Patent
Niu et al.

(10) Patent No.: US 12,156,185 B2
(45) Date of Patent: Nov. 26, 2024

(54) FR2 TYPE 1 UL GAP CONFIGURATION IN DYNAMIC TDD SYSTEM

(71) Applicant: APPLE INC., Cupertino, CA (US)

(72) Inventors: Huaning Niu, Cupertino, CA (US); Dawei Zhang, Cupertino, CA (US); Jie Cui, Cupertino, CA (US); Manasa Raghavan, Cupertino, CA (US); Qiming Li, Beijing (CN); Sharad Sambhwani, San Diego, CA (US); Xiang Chen, Cupertino, CA (US); Yang Tang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/593,363

(22) PCT Filed: Jul. 26, 2021

(86) PCT No.: PCT/CN2021/108416
§ 371 (c)(1),
(2) Date: Sep. 16, 2021

(87) PCT Pub. No.: WO2023/004536
PCT Pub. Date: Feb. 2, 2023

(65) Prior Publication Data
US 2024/0015704 A1    Jan. 11, 2024

(51) Int. Cl.
*H04W 72/0446* (2023.01)
*H04L 5/14* (2006.01)
(Continued)

(52) U.S. Cl.
CPC ....... *H04W 72/0446* (2013.01); *H04L 5/1469* (2013.01); *H04W 72/11* (2023.01); *H04W 72/231* (2023.01)

(58) Field of Classification Search
None
See application file for complete search history.

(56) References Cited

U.S. PATENT DOCUMENTS

2021/0105677 A1   4/2021  Jang et al.
2023/0328725 A1*  10/2023  Xu ................. H04L 1/1854
                                                370/329

FOREIGN PATENT DOCUMENTS

WO   2020167014 A1   8/2020
WO   2021064698 A1   4/2021

OTHER PUBLICATIONS

Nokia, Nokia Shanghai Bell, "Network impact of UE FR2 UL Gap for UE Tx power enhancements", R4-2109744, 3GPP TSG-RAN WG4#99-e Meeting, Electronic Meeting, Agenda Item 9.4.4.1, May 19-27, 2021, 4 pages.

(Continued)

*Primary Examiner* — Walter J Divito
(74) *Attorney, Agent, or Firm* — Dorsey & Whitney LLP

(57) ABSTRACT

Systems and methods for implementing uplink (UL) gaps to facilitate user equipment (UE) calibration are disclosed herein. A UE determines one or more slot patterns of a slot configuration that is repeated during time division duplex (TDD) communication with a base station. The UE determines a UL gap periodicity (defining periods covering an integer number of repetitions of the slot configuration). The UE then performs UE calibration during one or more semi-persistently configured UL slots of a period of the UL gap periodicity that correspond to UL indication(s) in one or more of a common configuration, a dedicated configuration, and/or a slot format indication (SFI) downlink control information (DCI) for the slot pattern(s) of the slot configuration. Methods of identifying particular semi-persistently configured UL slots of a period to use for the UL gap are also discussed. UL slot indications from dynamic DCI are not used for UL gap purposes.

20 Claims, 10 Drawing Sheets

(51) Int. Cl.
*H04W 72/11* (2023.01)
*H04W 72/231* (2023.01)

(56) References Cited

OTHER PUBLICATIONS

PCT/CN2021/108416, International Search Report and Written Opinion, Apr. 26, 2022, 9 pages.

\* cited by examiner

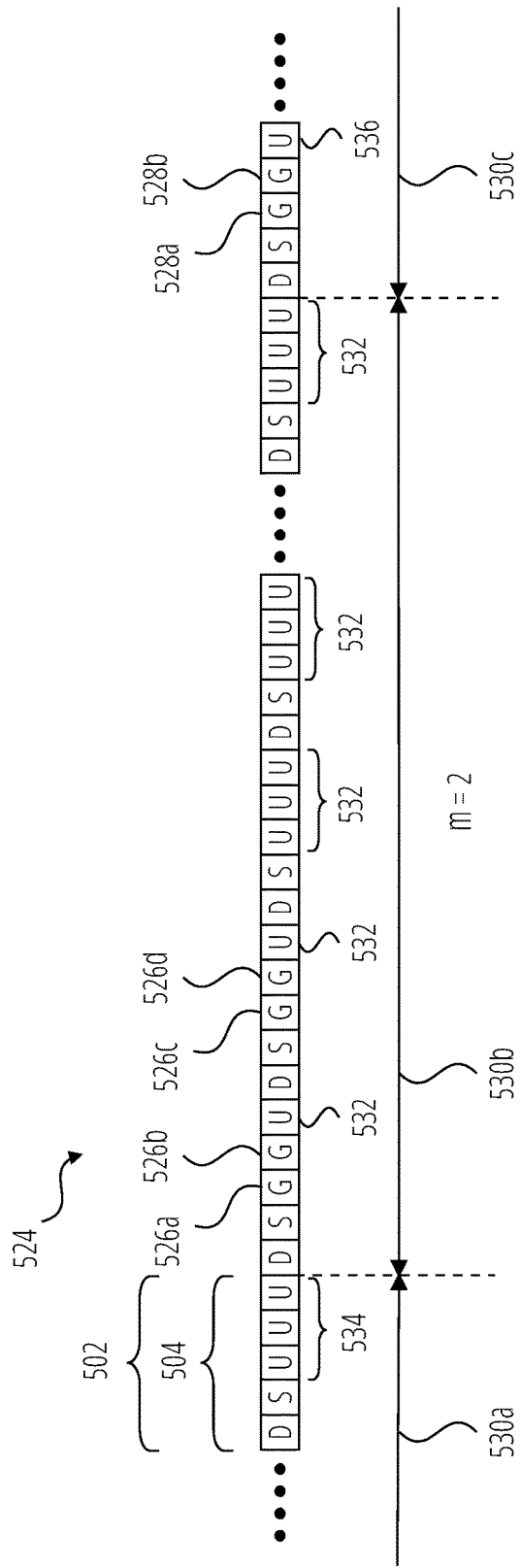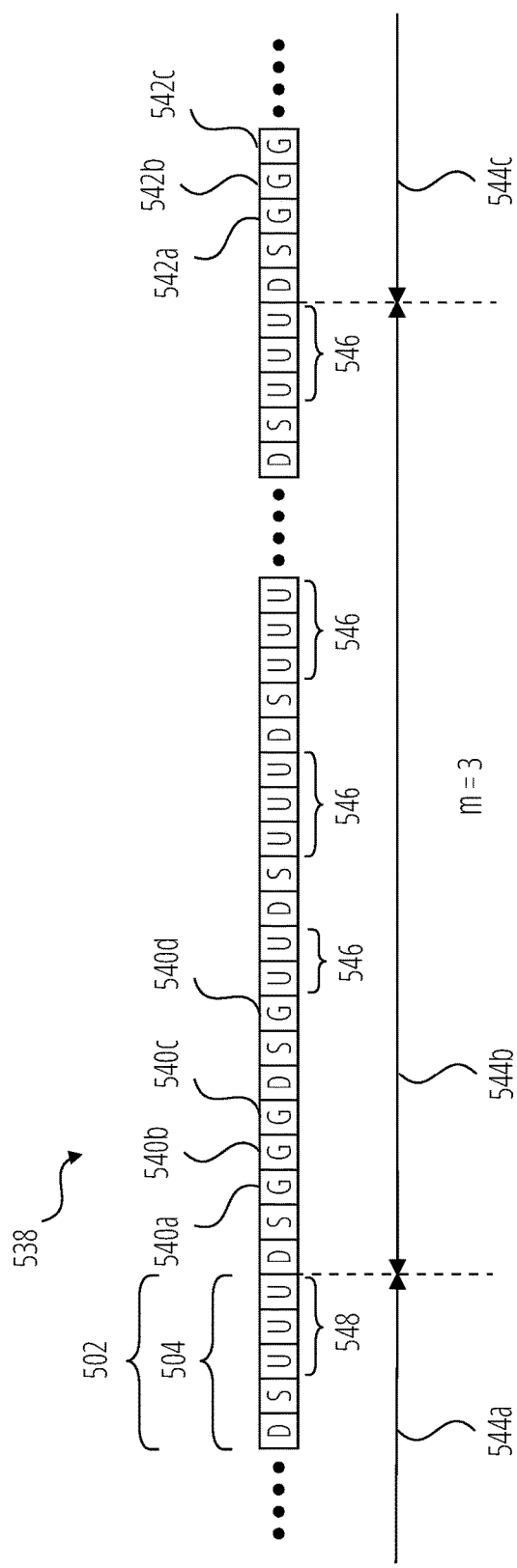

FR2 TYPE 1 UL GAP CONFIGURATION IN DYNAMIC TDD SYSTEM

TECHNICAL FIELD

This application relates generally to wireless communication systems, including systems using time division duplex (TDD) communications that implement uplink (UL) gaps during which user equipment (UE) calibration may be performed.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

Frequency bands for 5G NR may be separated into two or more different frequency ranges. For example, Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5C illustrates a use of the slot configuration to perform TDD communications that use a UL gap, according to an embodiment.

FIG. 5D illustrates a use of the slot configuration to perform TDD communications that use a UL gap, according to an embodiment.

DETAILED DESCRIPTION

Figure 1A:
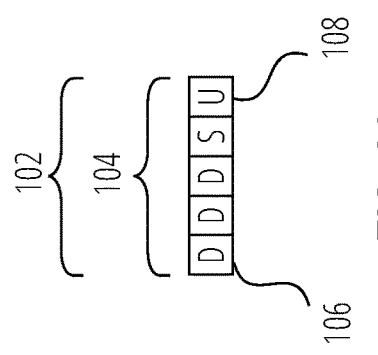
FIG. 1A illustrates a slot configuration used during time division duplex (TDD) communications, according to an embodiment.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

The enhancement of FR2 coverage in wireless communications systems in order to improve coverage, signal quality, and/or UE performance is of interest, motivated (at least) by a desire for increased power efficiency and/or overall system throughput. In some UEs that operate on FR2, various FR2 enhancements may rely on and/or benefit from the use of a UL gap. The UL gap may represent one or more UL slots during which no UL transmission is actually performed by the UE (or at least where any such UL transmissions would have their power greatly reduced). Then, during this UL gap, the UE may perform calibration and/or measurement over the air and/or through the internal loop of the UE.

In a first example of UE calibration using a UL gap, the UL gap may be used at the UE to measure and calibrate a power amplifier (PA) used at the UE. For example, UL gaps may be used to perform a periodic measurement of PA characteristics, such that the UE can make appropriate adjustments over time.

In a second example of UE calibration using a UL gap, the UL gap may additionally (or alternatively) be used to perform transceiver calibration. Occasional (re)calibration of a transceiver of the UE may be used to account for runtime impairment profile changes due to, for example, temperature changes at the UE. This transceiver calibration may help realize a maximized beamforming gain of an antenna array of the UE, such that FR2 performance may be improved.

In a third example of UE calibration using UL gaps, the UL gap may additionally (or alternatively) be used at the UE to perform transmit (Tx) power management. It may be desirable for the UE to adaptively adjust a Tx power in order to, for example, maximize UL coverage and/or throughput (or alternatively, UL efficiency), all while maintaining compliance with regulatory requirements regarding the power of such transmissions. A corresponding determination of the Tx power to be used/useable by the UE may be affected by/partially determined at the UE in view of environmental factors (such as, e.g., interference due to other transmissions in the area). Accordingly, the UL gap may be used by the UE to measure such environmental factors so the UE can more accurately calibrate its own Tx power.

It is contemplated that other examples of UE calibration that could be additionally (or alternatively) performed during one or more UL gaps may occur to one of ordinary skill in the art. In such cases, it is anticipated that the UL gaps disclosed herein could be used for such calibration examples as well.

Each of the preceding examples of UE calibration may implement a scheme where the UE sends a calibration signal and receives a return calibration signal (either over the air to a base station, or on the internal loop of the UE between Tx components and receive (Rx) components of the UE). This process may use the hardware for UL transmission. Accordingly, for any UL transmission that is not associated with the UE calibration process that would have otherwise been sent during the time that calibration takes place may be interrupted/affected. As described herein, UL transmissions not comprising part of a UE calibration process may be referred to herein as regular UE transmissions.

A provision of a known UL gap allocates time resources during which such an interruption to regular UL transmission (due to UE calibration) is expected/known to occur, thereby promoting organization within the wireless communication system. Systems and methods for predictably providing for/using such a UL gap may therefore be beneficial.

A UL gap may be understood to be a "Type 1" UL gap. A Type 1 UL gap may be a UL gap that is known to (and/or determinable by) and used by the UE without first receiving an explicit grant for the UL gap from a base station of the wireless communication system. During a Type 1 UL gap, all UE radio frequency (RF) requirements may apply. In the case of a Type 1 UL gap, it may be beneficial to ensure that the configuration of the UL gap is decided based on interdependent factors, with a goal of a good balance of the gains from UE calibration in view of a power management maximum power reduction (P-MPR). For example, there may be a tradeoff between UL gap overhead and Tx power gain. Since slots used for UL gap slots are used for body proximity sensing (BPS) sensing, there may be a corresponding UL throughput loss associated with this use. For example, Assume x % of a UL resource is used for sensing. In such a case, one might see a throughput loss of x % if no Tx power gain is obtained. On the other hand, with the use of the described UL gap, UE may ultimately be able to transmit with a higher Tx power (over the remaining UL slots not used for the UL gap), achieving better coverage and higher UL throughput.

It is contemplated that in some embodiments, a UE may be able to signal to a base station that it is capable of/is using UL gaps as disclosed herein. It is further contemplated that in some embodiments, a base station may be able to signal to a UE that it expects the UE to use UL gaps as disclosed herein.

NR provides time division duplex (TDD) configuration schema via which one or more slots (e.g., the symbols of those one or more slots) may be configured. Within each configured slot, each symbol can be formatted for UL, downlink (DL) or as a flexible symbol. A flexible symbol may be a symbol that can be used as either UL or DL (e.g., according to a subsequent configuration/indication for that symbol). Accordingly, a slot may be configured as a UL slot (e.g., all symbols of the slot are UL symbols), a DL slot (e.g., all symbols of the slot are DL symbols), a flexible slot (e.g., all symbols of the slot are flexible symbols) or a special slot (e.g., the symbols of the slot are a mix of symbol types).

In some cases, the NR TDD is configured using dynamic scheduling. In dynamic scheduling, the amount and nature of the slots to be used by the UE (e.g., the nature of the symbols of those slots) are dynamically configured on demand by the base station using dynamic downlink control information (DCI) in a physical downlink control channel (PDCCH).

In some cases, the NR TDD is configured using semi-persistent (SP) configuration techniques. An SP configuration of the amount and nature of the slots to be used by the UE may be re-used by the UE through time, for example, unless and until an updated SP configuration arrives at the UE.

An SP configuration may be a multi-part, hierarchical configuration used to configure one or more slot patterns of a slot configuration used in TDD communications. For a first hierarchical part of the SP configuration, a UE may be provided a common configuration (e.g., in a 'tdd-UL-DL-ConfigurationCommon' information element) that indicates one or more slot patterns to be used by the UE as part of a slot configuration used during TDD communications. The common configuration may be applicable to all UE that share the same serving cell of the UE in question. The common configuration may be sent to the UE via a system information block (SIB) (e.g., SIB1) of the base station and/or via dedicated RRC signaling. The common configuration may indicate the locations of any uplink, downlink, flexible, and/or special slots within the configured slot pattern(s). Further, the common configuration may also indicate the locations of any uplink, downlink, or flexible symbols within any special slots of the configured slot pattern(s). Accordingly, at the level of the first hierarchical part, the arrangement of all symbols of all slots in the slot pattern(s) may be fully determined (subject to possible further adjustment, as will be described). A common configuration may be a form of configuration information, as used herein.

For a second hierarchical part of an SP configuration, a UE may be provided with a dedicated configuration (e.g., in a 'tdd-UL-DL-ConfigurationDedicated' information element) for each of one or more of the slot pattern(s) used by the UE as part of a slot configuration used during TDD communications. The dedicated configuration may be specific to the UE (e.g., not necessarily the same as any other dedicated configuration that may be provided to other UE of the serving cell). The dedicated configuration may be sent to the UE via dedicated RRC signaling. The dedicated configuration may indicate whether any flexible slots/symbols (as configured by the first hierarchical part of the SP configuration) should be used instead in the corresponding a slot pattern as uplink/downlink slots/symbols. A dedicated configuration may be a form of configuration information, as used herein.

For a third hierarchical part of an SP configuration, a UE may receive slot format indication (SFI) DCI (e.g., in a group common DCI of format 2_0 that is scrambled by an SFI radio network temporary identifier (SFI-RNTI)) indicating a slot format of one or more slots of one or more of the slot pattern(s) to be used by the UE as part of a slot configuration used during TDD communications. Such an indicated slot format may indicate for a downlink, uplink, or flexible use according to (individually) each symbol in the corresponding slot, and may be communicated according to a predetermined table of possible slot formats indicatable by the SFI DCI. Accordingly, for any such slots so configured by SFI DCI, any flexible symbols still present after the configuration of that slot according to the first hierarchical part (and the second hierarchical part, if performed) may be changed to uplink or downlink symbols to match the slot format for that slot from the SFI DCI. Note that this process may not change any symbols previously configured as UL or DL symbols according to the first hierarchical part (or by the second hierarchical part, if such was performed). An SFI DCI may be a form of configuration information, as used herein.

Further details regarding SP configuration as described herein can be found in 3GPP TS 38.213 (version 16.6.0, June 2021), Section 11.1, "Slot Configuration," which is incorporated herein by reference.

FIG. 1A illustrates a slot configuration 102 used during TDD communications, according to an embodiment. The slot configuration 102 includes the first slot pattern 104. As illustrated, the first slot pattern 104 is that of three downlink slots followed by a special slot followed by an uplink slot. The first slot pattern 104 may have been configured according to a first hierarchical part of an SP configuration (e.g., as received in SIB and/or RRC configuration information from the base station). For example, the first slot pattern 104 may be arranged according to a common configuration for the first slot pattern 104 (e.g., as found in a 'tdd-UL-DL-ConfigurationCommon' information element).

A slot indication, as described herein, may be an indication in information (e.g., configuration information and/or DCI) that specifies a slot format for a slot of, for example, a slot configuration. Accordingly, it may be said that the slot configuration 102 is made up of slots that correspond to slot indications in the common configuration (as such slot indications are reflected in the first slot pattern 104 according to the common configuration). For example, the slot configuration 102 may be made up of the DL slot 106 and the UL slot 108, each corresponding to UL slot indications of the common configuration (and according to the first slot pattern 104 of the common configuration), along with other slots, as illustrated.

The length of the first slot pattern 104 (in time) may be provided in configuration information for the first slot pattern 104 (e.g., as a 'dl-UL-TransmissionPeriodicity' parameter), and may be denoted herein as P. As illustrated, in the embodiment of FIG. 1A and FIG. 1B, because the slot configuration 102 is coextensive with the first slot pattern 104, the length of the slot configuration 102 may also be understood by the UE to be P.

Figure 1B:
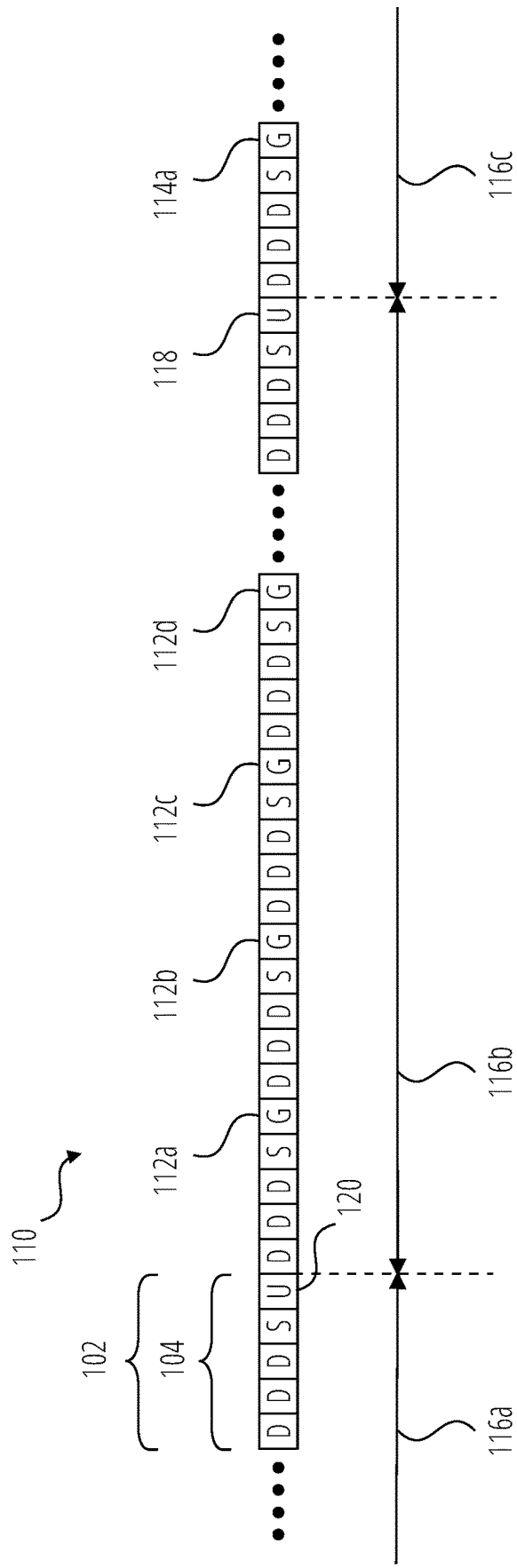
FIG. 1B illustrates a use of the slot configuration to perform TDD communications that use an uplink (UL) gap, according to an embodiment.

FIG. 1B illustrates a use of the slot configuration 102 to perform TDD communications 110 that use a UL gap, according to an embodiment. As illustrated, the TDD communications 110 proceed according to repetitions of the slot configuration 102 (which is made up of the first slot pattern 104). The repetitions of the slot configuration 102 illustrated in the TDD communications 110 may, in some embodiments, be initialized such that the first symbol of every 20/P repetitions of the slot configuration 102 is a first symbol in an even numbered radio frame.

The UE may determine a UL gap periodicity. For example, in some cases, the base station may signal the UL gap periodicity to the UE, allowing the UE to make this determination directly based on the signaled value. The signaled value may be an amount of time corresponding to a number of repetitions (denoted herein as N) of the slot configuration of length P in a single UL gap periodicity. In other words, the base station may signal a value for the UL gap periodicity (that is equal to NP) that the UE accordingly determines directly. In other cases, the UE may determine the UL gap periodicity based on its understanding of the length of the slot configuration 102. In such cases, the base station may signal to the UE the number repetitions of slot configuration in a single UL gap periodicity (e.g., signal to the UE the value of N), and the UE may then calculate the UL gap periodicity using the formula NP.

In either case, the UL gap periodicity may be equal to NP. In the embodiment of FIG. 1A and FIG. 1B the periods 116a, 116b, and 116c (illustrated in FIG. 1B) of the UL gap periodicity are of length NP.

Further, the UE may be able to identify the location(s) of one (or more) of the periods 116a, 116b and 116c within the TDD communications 110. These locations may be UE-specific (e.g., a first UE may be configured to use different locations for the periods within TDD communications 110 than a second UE also using the TDD communication 110). The base station may control these locations for each UE by providing the UE with an offset value. This behavior may allow the base station to co-ordinate multiple UE using the TDD communications 110 (for instance, so that one UE may perform regular UL during a time that a second UE is performing UE calibration). This offset value corresponds to the location where the UE should consider its periods of the TDD communications 110 to begin. Then, once the UE has determined a UL gap periodicity (as described previously), the UE can locate the starting subframe of one of the periods 116a, 116b, and 116c using the formula (SFN×10+SubFN)mod(UL gapperiodicity)=Offset, where UL gapperiodicity=NP (as described above), SFN is a system frame number, and SubFN is the subframe within that system frame.

The UE may further determine the value of a UL gap length. In some embodiments, the UL gap length may be determined according to an indication of the UL gap length made by the base station to the UE.

A UL gap length may, in some embodiments herein, correspond to a number of semi-persistently configured UL slots of a period of the UL gap periodicity that are to be used for UE calibration purposes. Accordingly, as used herein, reference to semi-persistently configured UL slots of a period of a UL gap periodicity may be understood to refer to a number of UL slots (e.g., up to the UL gap length) of the period that are configured according to an SP configuration for a slot configuration repeated in the period.

In the embodiment of FIG. 1B, the UE has determined the UL gap length to be equal to four. Accordingly, during each period 116a, 116b, and 116c of the UL gap periodicity, four semi-persistently configured UL slots are used for UE calibration purposes according to a UL gap. Note that these have each been denoted 'G' (corresponding to the fact that the UE will use each such UL slot as a UL gap for UE calibration) instead of 'U' (which might correspond to use of the slot by the UE for regular UL transmission). For example, in FIG. 1B, the first semi-persistently configured UL slot 112a, the second semi-persistently configured UL slot 112b, the third semi-persistently configured UL slot 112c, and the fourth semi-persistently configured UL slot 112d (denoted 'G') within the period 116b may be used for UE calibration, while UL slots within the period 116b that are not used for UE calibration (such as the UL slot 118) remain available for regular UL transmissions.

In some cases, the UL gap length may correspond to an initial number of such semi-persistently configuration UL slots of the period. As used herein, reference to initial semi-persistently configured UL slots of a period of the UL gap periodicity may be understood to refer to the initial (e.g., first) number of UL slots of the period (e.g., up to the UL gap length) that are configured according to an SP configuration for a slot configuration repeated in the period.

FIG. 1B illustrates the use, according to a determination by the UE, of a UL gap according to initial semi-persistently configured UL slots of a period (in part) in relation to the semi-persistently configured UL slots 112a through 112d of the period 116b of the UL gap periodicity. As illustrated, each of the first semi-persistently configured UL slot 112a, the second semi-persistently configured UL slot 112b, the third semi-persistently configured UL slot 112c, and the fourth semi-persistently configured UL slot 112d is an initial semi-persistently configured UL slot of the period 116b.

Further, as can be seen, each of the first semi-persistently configured UL slot 112a, the second semi-persistently configured UL slot 112b, the third semi-persistently configured UL slot 112c, and the fourth semi-persistently configured UL slot 112d corresponds to the first slot pattern 104, in that these slots are indicated for UL according to the use of the first slot pattern 104 within the repetitions of the slot configuration 102 in the TDD communications 110. Further, because the first slot pattern 104 is arranged according to a common configuration, each of the first semi-persistently configured UL slot 112a, the second semi-persistently configured UL slot 112b, the third semi-persistently configured UL slot 112c, and the fourth semi-persistently configured UL slot 112d may be understood to correspond to UL slot indications from the common configuration used to generate the first slot pattern 104, according to an SP configuration.

Finally, each period of a UL gap periodicity of the TDD communications 110 may use the same arrangement (according to a use of initial semi-persistently configured UL slots for an UL gap) as the period 116b. This is illustrated in reference to the UL slot 120 of the period 116a (which is a UL slot for regular UL transmission, presuming that four semi-persistently configured UL slots for UE calibration occurred previously during the period 116a), and the fifth semi-persistently configured UL slot 114a (which may be a first of four initial semi-persistently configured UL slots of the period 116c to be used for UE calibration instead of for regular UL transmission).

Figure 2A:
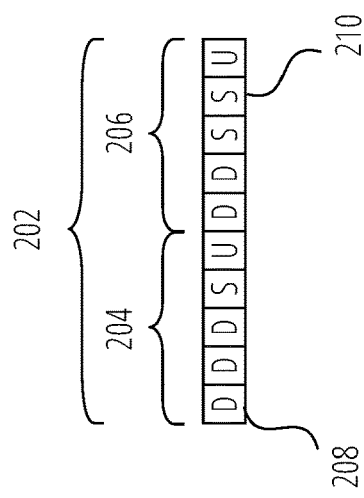
FIG. 2A illustrates a slot configuration used during TDD communications, according to an embodiment.

FIG. 2A illustrates a slot configuration 202 used during TDD communications, according to an embodiment. The slot configuration 202 includes the first slot pattern 204 and the second slot pattern 206. As illustrated, the first slot pattern 204 is that of three downlink slots followed by a special slot followed by an uplink slot, and the second slot pattern 206 is that of two downlink slots followed by two special slots followed by an uplink slot. The first slot pattern 204 and the second slot pattern 206 may have been configured according to a first hierarchical part of an SP configuration (e.g., as received in RRC configuration information from the base station). For example, each of the first slot pattern 204 and the second slot pattern 206 may be arranged according to a common configuration for that respective slot pattern in a 'tdd-UL-DL-ConfigurationCommon' information element.

Further, it may be said that the slot configuration 202 is made up of slots that correspond to slot indications in the common configuration (as such slot indications are reflected in the first slot pattern 204 and the second slot pattern 206 according to the common configuration). For example, the slot configuration 202 may be made of the first downlink DL slot 208 corresponding to a DL slot indication the common configuration (and according to the first slot pattern 204 of the common configuration) and the special slot 210 corresponding to a special slot indication of the common configuration (and according to the second slot pattern 206 of the common configuration), along with other slots, as illustrated.

The length of the first slot pattern 204 (in time) may be provided in configuration information for the first slot pattern 204 (e.g., as a 'dl-UL-TransmissionPeriodicity' parameter), and may be denoted herein as P. Further, the length of the second slot pattern 206 (in time) may be provided in configuration information for the second slot pattern 206 (e.g., as a 'dl-UL-TransmissionPeriodicity' parameter), and may be denoted herein as $P_2$. As illustrated, in the embodiment of FIG. 2A and FIG. 2B, because the slot configuration 202 is coextensive with the combination of the first slot pattern 204 with the second slot pattern 206, the length of the slot configuration 102 may accordingly be understood by the UE to be the sum of the length of the first slot pattern 204 and the length of the second slot pattern 206, or $P+P_2$.

Figure 2B:
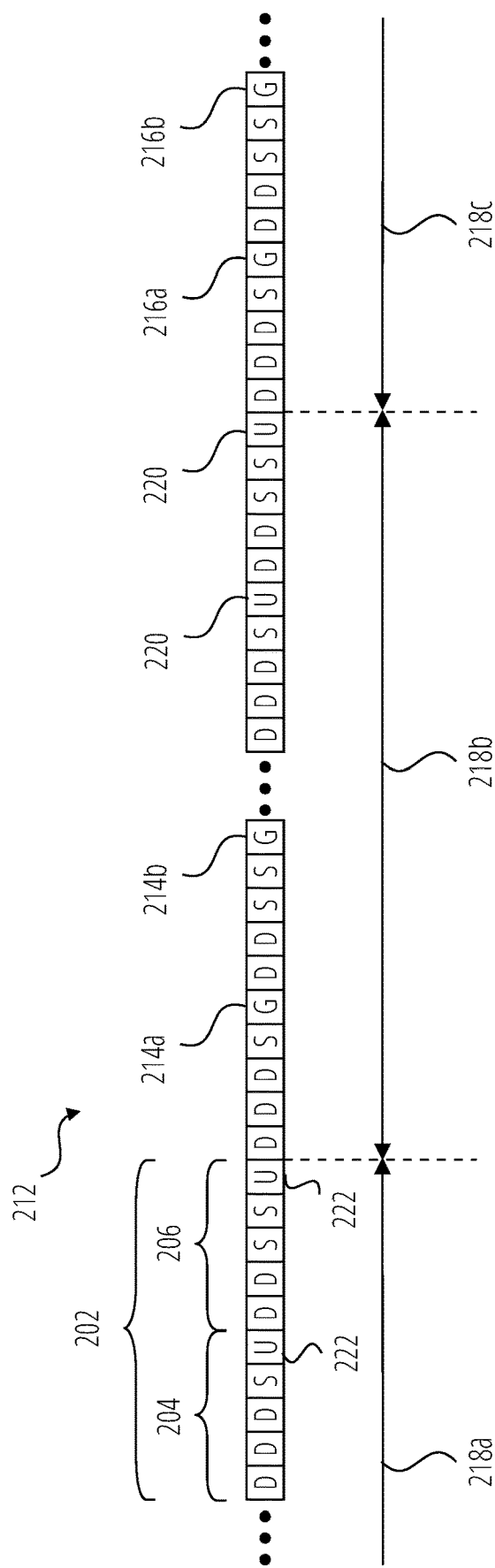
FIG. 2B illustrates a use of the slot configuration to perform TDD communications that use a UL gap, according to an embodiment.

FIG. 2B illustrates a use of the slot configuration 202 to perform TDD communications 212 that use a UL gap, according to an embodiment. As illustrated, the TDD communications 212 proceed according to repetitions of the slot configuration 202 (which is made up of the first slot pattern 204 and the second slot pattern 206). The repetitions of the slot configuration 202 illustrated in the TDD communications 212 may, in some embodiments, be initialized such that the first symbol of every 20/(P+P$_2$) repetitions of the slot configuration 202 is a first symbol in an even numbered radio frame.

The UE may determine a UL gap periodicity. For example, in some cases, the base station may signal the UL gap periodicity to the UE, allowing the UE to make this determination directly based on the signaled value. The signaled value may be the amount of time corresponding to a number of repetitions (denoted as N) of the slot configuration of length P+P$_2$ in a single UL gap periodicity. In other words, the base station may signal a value for the UL gap periodicity (that is equal to N(P+P$_2$)) to the UE directly. In other cases, the UE may determine the UL gap periodicity based on its understanding of the length of the slot configuration 102. In such cases, the base station may signal to the UE the number repetitions of slot configuration in a single UL gap periodicity (e.g., signal to the UE the value of N), and the UE may then calculate the UL gap periodicity using the formula N(P+P$_2$).

In either case, the UL gap periodicity may be equal to N(P+P$_2$). In the embodiment of FIG. 2A and FIG. 2B the periods 218a, 218b, and 218c (illustrated in FIG. 2B) of the UL gap periodicity are of length N(P+P$_2$).

Further, the UE may be able to identify the location(s) of one (or more) of the periods 218a, 218b and 218c within the TDD communications 212 using an offset value provided to the UE by the base station, as described above. In such cases, once the UE has also determined the UL gap periodicity, it can locate the starting subframe of one of the periods 116a, 116b, and 116c using the formula (SFN×10+SubFN)mod(UL gap periodicity)=Offset, where UL gap periodicity=N(P+P$_2$) (as described above), SPIN is a system frame number, and SubFN is the subframe within that system frame.

The UE may further determine the value of a UL gap length (e.g., according to an indication of the UL gap length made by the base station to the UE). In the embodiment of FIG. 2B, the UE has determined the UL gap length to be equal to two. Accordingly, during each period 218a, 218b, and 218c of the UL gap periodicity, two semi-persistently configured UL slots are used for UE calibration purposes according to a UL gap. Note that these have been denoted 'G' (corresponding to the fact that the UE will use each such UL slot as a UL gap for UE calibration) instead of 'U' (which might correspond to use of the slot by the UE for regular UL transmission). For example, in FIG. 2B, the first semi-persistently configured UL slot 214a and the second semi-persistently configured UL slot 214b (denoted 'G') may be used for UE calibration, while UL slots within the period 116b that are not used for UE calibration (such as the UL slots 220) remain available for regular UL transmissions.

FIG. 2B illustrates the use, according to a determination by the UE, of a UL gap according to initial semi-persistently configured UL slot of a period (in part) in relation to the two semi-persistently configured UL slots 214a and 214b of the period 218b of the UL gap periodicity. As illustrated, each of the first semi-persistently configured UL slot 214a and the second semi-persistently configured UL slot 214b is an initial semi-persistently configured UL slot of the period 218b.

Further, as can be seen, the first semi-persistently configured UL slot 214a corresponds to the first slot pattern 204, in that this slot is indicated for UL according to the use of the first slot pattern 204 within the repetitions of the slot configuration 202 in the TDD communications 212. Further, because the first slot pattern 204 is arranged according to a common configuration, the first semi-persistently configured UL slot 214a may be understood to correspond to a UL slot indication from the common configuration used to generate the first slot pattern 204 according to an SP configuration.

Additionally, as can be seen, the second semi-persistently configured UL slot 214b corresponds to the second slot pattern 206, in that this slot is indicated for UL according to the use of the second slot pattern 206 within the repetitions of the slot configuration 202 in the TDD communications 212. Further, because the second slot pattern 206 is arranged according to a common configuration, the second semi-persistently configured UL slot 214b may be understood to correspond to a UL slot indication from the common configuration used to generate the second slot pattern 206 according to an SP configuration.

Finally, each period of a UL gap periodicity may use the same arrangement (according to a use of initial semi-persistently configured UL slots of period for an UL gap) as the period 218b. This is illustrated in reference to the UL slots 222 of the period 218a (which are UL slots for regular UL transmission, presuming that two semi-persistently configured UL slots for UE calibration occurred previously during the period 218a), and the third semi-persistently configured UL slot 216a and the fourth semi-persistently configured UL slot 216b (which may be the two initial semi-persistently configured UL slots of the period 218c to be used for UE calibration instead of for regular UL transmission).

Figure 3A:
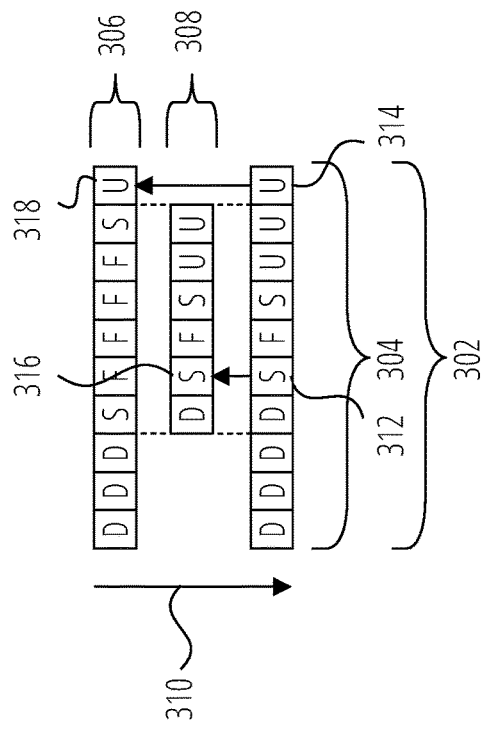
FIG. 3A illustrates a slot configuration used during TDD communications, according to an embodiment.

FIG. 3A illustrates a slot configuration 302 used during TDD communications, according to an embodiment. The slot configuration 302 includes the first slot pattern 304. As illustrated, the first slot pattern 304 is that of four downlink slots followed by a special slot followed by a flexible slot followed by a special slot followed by three uplink slots. The first slot pattern 304 may have been configured according to a first hierarchical part and a second hierarchical part of an SP configuration (e.g., as received in SIB and/or RRC configuration information from the base station), according to configurations provided corresponding to the first and second hierarchical parts. For example, the common configuration 306 may be arranged according to a 'tdd-UL-DL-ConfigurationCommon' information element. The dedicated configuration 308 may be arranged according to a 'tdd-UL-DL-ConfigurationDedicated' information element corresponding to the first slot pattern 304. As described above, the dedicated configuration 308 indicates any slots/symbols that should be flexible slots/symbols in the first slot pattern 304 beyond those provided for in the common configuration 306. Accordingly, the first slot pattern 304 is arrived at 310 through the use of the dedicated configuration 308 to further specify flexible symbols/slots of the common configuration 306, in the manner illustrated.

It may be said that the slot configuration 302 is made up of slots that each correspond to slot indications in one of the common configuration 306 and the dedicated configuration 308. For example, the slot configuration 302 may be made of the special slot 312 and the UL slot 314 (along with other slots, as illustrated). The special slot 312 corresponds to a special slot indication 316 of the dedicated configuration 308 for that same position (as indicated by an arrow up from the special slot 312 that points at that special slot indication of the dedicated configuration 308), while the UL slot 314 corresponds to a UL slot indication 318 in the common configuration 306 found in that same position (as indicated by an arrow up from the UL slot 314 to that points at that UL slot indication of the common configuration 306).

The length of the first slot pattern 304 (in time) may be provided in configuration information for the first slot pattern 304 (e.g., as a 'dl-UL-TransmissionPeriodicity' parameter), and may be denoted herein as P. As illustrated, in the embodiment of FIG. 3A and FIG. 3B, because the slot configuration 302 is coextensive with the first slot pattern 304, the length of the slot configuration 302 may also be understood by the UE to be P.

Figure 3B:
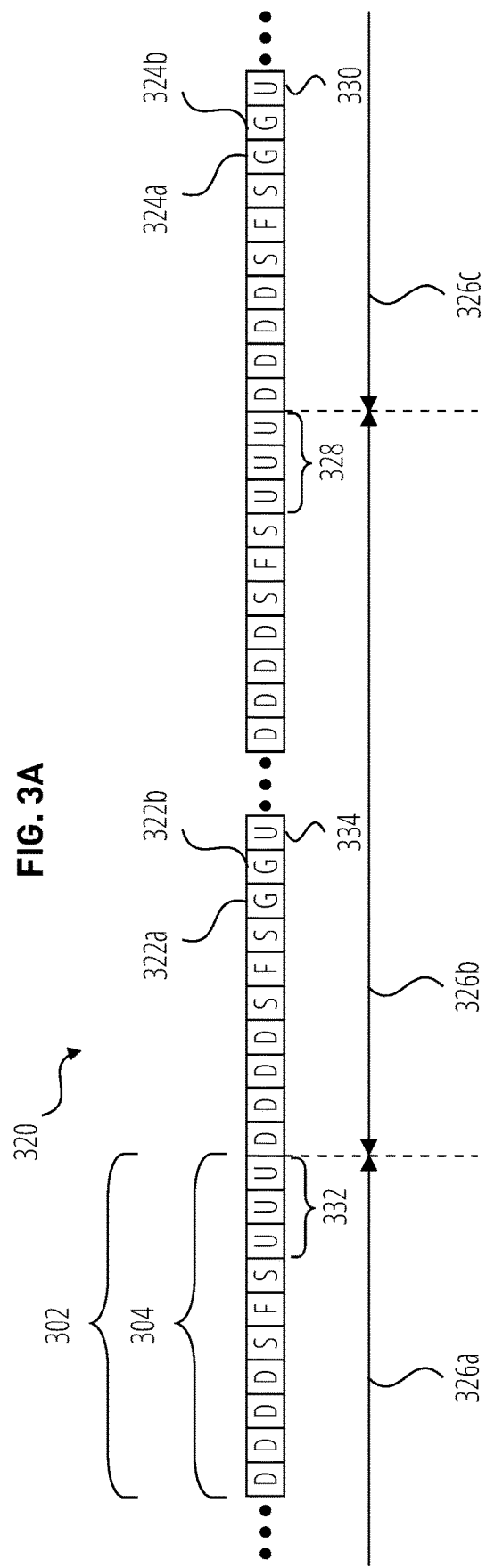
FIG. 3B illustrates a use of the slot configuration to perform TDD communications that use a UL gap, according to an embodiment.

FIG. 3B illustrates a use of the slot configuration 302 to perform TDD communications 320 that use a UL gap, according to an embodiment. As illustrated, the TDD communications 320 proceed according to repetitions of the slot configuration 302 (which is made up of the first slot pattern 304).

The embodiment of FIG. 3A and FIG. 3B uses a slot configuration 302 that is coextensive with a single slot pattern (the first slot pattern 304). Accordingly, the embodiment of FIG. 3A and FIG. 3B may be analogous in many ways to the embodiment of FIG. 1A and FIG. 1B, which shares the same characteristic. Accordingly, it should be understood, for example, that the repetitions of the slot configuration 302 illustrated in the TDD communications 320 may be initialized such that the first symbol of every 20/P repetitions of the slot configuration 302 is a first symbol in an even numbered radio frame, that the UE may determine a UL gap periodicity that is a multiple of the first slot pattern 304 (denoted herein as NP), and that the UE may be able to identify the location(s) of one (or more) of the periods 326a, 326b, and/or 326c of the UL gap periodicity by using a received offset and the formula (SFN×10+SubFN)mod(UL gap periodicity)=Offset (where UL gap periodicity=NP).

The UE may also determine a UL gap length (e.g., according to an indication of the UL gap length made by the base station to the UE). In the embodiment of FIG. 3B, the UE has determined the UL gap length to be equal to two. Accordingly, during each period 326a, 326b, and 326c of the UL gap periodicity, two semi-persistently configured UL slots are used for UE calibration purposes according to a UL gap. Note that these have been denoted 'G' (corresponding to the fact that the UE will use each such UL slot as a UL gap for UE calibration) instead of 'U' (which might correspond to use of the slot by the UE for regular UL transmission). For example, in FIG. 3B, the first semi-persistently configured UL slot 322a and the second semi-persistently configured UL slot 322b (denoted 'G') may be used for UE calibration, while UL slots within the period 326b that are not used for UE calibration (such as the UL slots 328 and the UL slot 334) remain available for regular UL transmissions.

FIG. 3B illustrates the use, according to a determination by the UE, of a UL gap according to initial semi-persistently configured UL slots of a period (in part) in relation to the two semi-persistently configured UL slots 322a and 322b of the period 326b of the UL gap periodicity. As illustrated, each of the first semi-persistently configured UL slot 322a and the second semi-persistently configured UL slot 322b is an initial semi-persistently configured UL slot of the period 326b.

Further, as can be seen, each of the first semi-persistently configured UL slot 322a and the second semi-persistently configured UL slot 322b corresponds to the first slot pattern 304, in that these slots are indicated for UL according to the use of the first slot pattern 304 within the repetitions of the slot configuration 302 in the TDD communications 320. It can also be seen (with reference back to the dedicated configuration 308 FIG. 3A) that each of the first semi-persistently configured UL slot 322a and the second semi-persistently configured UL slot 322b correspond to UL slot indications from the dedicated configuration 308 that was used to generate the first slot pattern 304 according to an SP configuration.

Alternatively to the embodiment illustrated in FIG. 3A and FIG. 3B, if, for example, the dedicated configuration 308 had only contained a single UL indication (e.g., in its last specified symbol), the slot configuration 302 would have ultimately ended with only two UL symbols (instead of three). In such a case, the first semi-persistently configured UL slot 322a would instead be a flexible slot, and the UL slot 334 would have been used as the second (of the two) initial semi-persistently configured UL slots (which would have corresponded to the illustrated corresponding UL indication in the common configuration 306, instead of any UL indication in the dedicated configuration 308).

Returning to the embodiment of FIG. 3A and FIG. 3B, each period of a UL gap periodicity may use the same arrangement (according to a use of initial semi-persistently configured UL slots of period for an UL gap) as the period 326b. This is illustrated in reference to the UL slots 332 of the period 326a (which are UL slots for regular UL transmission, presuming that two semi-persistently configured UL slots for UE calibration occurred previously during the period 326a), and the third semi-persistently configured UL slot 324a and the fourth semi-persistently configured UL slot 324b (which may be the two initial semi-persistently configured UL slots of the period 326c to be used for UE calibration instead of for regular UL transmission) and the UL slot 330 (which is a UL slot of period 326c for regular UL transmission).

Persons of ordinary skill in the art, with the benefit of this disclosure, would understand that the use of slot patterns configured according to a first hierarchical part and a second hierarchical part of an SP configuration (an example of which has been presented in relation to the embodiment of FIG. 3A and FIG. 3B) could be extended into embodiments involving more than one configured slot pattern (analogously to content presented in relation to the embodiments of FIG. 2A and FIG. 2B herein). For example, it may be that a slot configuration corresponds to first slot pattern of length P and second slot pattern of length $P_2$, giving the slot configuration a length of $P+P_2$, and that one (or both) of such slot patterns is configured according to a first hierarchical part and a second hierarchical part of an SP configuration. In such a case, repetitions of such a slot configuration may be initialized such that the first symbol of every $20/(P+P_2)$ repetitions of the slot configuration is a first symbol in an even numbered radio frame, that the UE may determine a UL gap periodicity that is a multiple of the first slot pattern and the second slot pattern (denoted as $N(P+P_2)$) and that accordingly comprises repetitions of the slot configuration, and that the UE may be able to identify the location(s) of one (or more) of those periods of the UL gap periodicity by using a received offset and the formula (SFN×10+SubFN)mod(UL gap periodicity)=Offset, but with UL gap periodicity=$N(P+P_2)$.

Then, as described herein, initial semi-persistently configured UL slots of such a period may be used for UE calibration. The number of these semi-persistently configured UL slots may be equal to the UL gap length. Further, these semi-persistently configured UL slots may correspond to slots indicated for UL in one or more of the first slot pattern and the second slot pattern. These semi-persistently configured UL slots may accordingly each also be understood to correspond to a UL slot indication in a common configuration for the respective slot pattern, or optionally in a dedicated configuration for the respective slot pattern (if such was provided in relation to the slot pattern), as appropriate, according to an SP configuration.

Figure 4A:
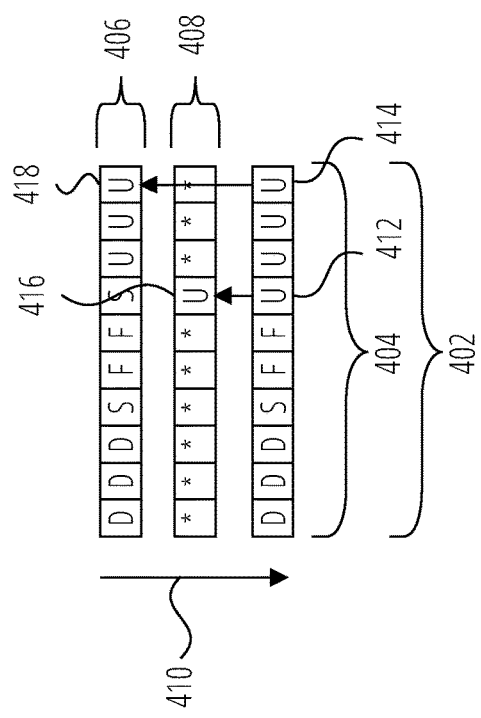
FIG. 4A illustrates a slot configuration used during TDD communications, according to an embodiment.

FIG. 4A illustrates a slot configuration 402 used during TDD communications, according to an embodiment. The slot configuration 402 includes the first slot pattern 404. As illustrated, the first slot pattern 404 is that of three downlink slots followed by a special slot followed by two flexible slots followed by four uplink slots.

The first slot pattern 404 may have been determined according to the use of a SIB/RRC slot configuration 406 in combination with an SFI DCI 408. The SIB/RRC slot configuration 406 may have been determined according to a first hierarchical part (and optionally by a second hierarchical part) of an SP configuration (e.g., as these may be received in SIB and/or RRC configuration information from the base station), according common (and optionally dedicated) configurations provided corresponding to the first (and optionally second hierarchical parts). For example, the SIB/RRC slot configuration 406 may be arranged according to a 'tdd-UL-DL-ConfigurationCommon' information element (and optionally a 'tdd-UL-DL-ConfigurationDedicated' information element) corresponding to the first slot pattern 404.

Then, the UE may receive the SFI DCI 408. In such a case, the first slot pattern 404 of the slot configuration 402 is arrived at 410 through the use of the SFI DCI 408 to further specify flexible symbols/slots of the SIB/RRC slot configuration 406, in the manner illustrated. For example, the SFI DCI 408 may make the UL slot indication 416 corresponding to the location of the second special slot, as configured by the SIB/RRC slot configuration 406, indicating that the UL slot 412 of the slot configuration 402 should instead have a slot format of all uplink symbols. This may be according to a SlotFormatCombination element in the DCI that is configured to all UL symbols. Making the change to that slot as indicated by the SFI DCI 408 results in the first slot pattern 404.

It may be said that the slot configuration 402 is made up of slots that each correspond to a slot of the SIB/RRC slot configuration 406 or a slot indication in the SFI DCI 408. For example, the slot configuration 402 may be made of the UL slot 412 and the UL slot 414 (along with other slots, as illustrated). The UL slot 412 corresponds to a UL slot indication of the SFI DCI 408 for that same position (as indicated by an arrow up from the UL slot indication 416 that points to the UL slot indication 416 of the SFI DCI 408), while the UL slot 414 corresponds to a UL slot of the SIB/RRC slot configuration 406 found in that same position (as indicated by an arrow up from the UL slot 414 that points to the UL slot 418 of the SIB/RRC slot configuration 406).

The length of the first slot pattern 404 (in time) may be provided in configuration information for the first slot pattern 404 (e.g., as a 'dl-UL-TransmissionPeriodicity' parameter), and may be denoted herein as P. As illustrated, in the embodiment of FIG. 4A and FIG. 4B, because the slot configuration 402 is coextensive with the first slot pattern 404, the length of the slot configuration 402 may also be understood by the UE to be P.

Figure 4B:
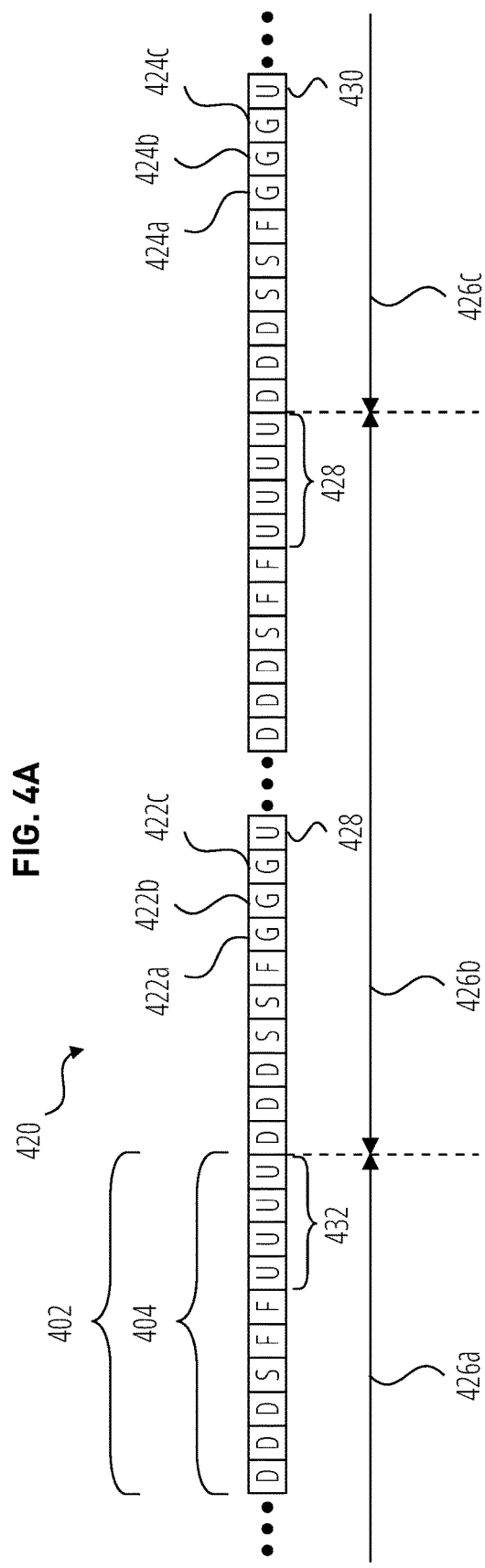
FIG. 4B illustrates a use of the slot configuration to perform TDD communications that use a UL gap, according to an embodiment.

FIG. 4B illustrates a use of the slot configuration 402 to perform TDD communications 420 that use a UL gap, according to an embodiment. As illustrated, the TDD communications 420 proceed according to repetitions of the slot configuration 402 (which is made up of the first slot pattern 404).

The embodiment of FIG. 4A and FIG. 4B uses a slot configuration 402 that is coextensive with a single slot pattern (the first slot pattern 404). Accordingly, the embodiment of FIG. 4A and FIG. 4B may be analogous in many ways to the embodiment of FIG. 1A and FIG. 1B, which shares the same characteristic. Accordingly, it should be understood, for example, that the repetitions of the slot configuration 402 illustrated in the TDD communications 420 may be initialized such that the first symbol of every 20/P repetitions of the slot configuration 402 is a first symbol in an even numbered radio frame, that the UE may determine a UL gap periodicity that is a multiple of the first slot pattern 404 (denoted as NP), and that the UE may be able to identify the location(s) of one (or more) of the periods 426a, 426b, and/or 426c of the UL gap periodicity by using a received offset and the formula (SFN×10+SubFN)mod(UL gap periodicity)=Offset (where UL gap periodicity=NP)

The UE may also determine a UL gap length (e.g., according to an indication of the UL gap length made by the base station to the UE). In the embodiment of FIG. 4B, the UE has determined the UL gap length to be equal to three. Accordingly, during each period 426a, 426b, and 426c of the UL gap periodicity, three UL slots are used for UE calibration purposes according to a UL gap. Note that these have been denoted 'G' (corresponding to the fact that the UE will use each such UL slot as a UL gap for UE calibration) instead of 'U' (which might correspond to use of the slot by the UE for regular UL transmission). For example, in FIG. 4B, the first semi-persistently configured UL slot 422a, the second semi-persistently configured UL slot 422b, and the third semi-persistently configured UL slot 422c (denoted 'G') may be used for UE calibration, while UL slots within the period 426b that are not used for UE calibration (such as the UL slots 428), denoted 'U', remain available for regular UL transmissions FIG. 4B illustrates the use, according to a determination by the UE, of a UL gap according to initial semi-persistently configured UL slots of a period (in part) in relation to the three semi-persistently configured UL slots 422a, 422b, and 422c of the period 426b of the UL gap periodicity. As illustrated, each of the first semi-persistently configured UL slot 422a, the second semi-persistently configured UL slot 422b, and the third semi-persistently configured UL slot 422c is an initial semi-persistently configured UL slot of the period 426b.

Further, as can be seen, each of the first semi-persistently configured UL slot 422a, the second semi-persistently configured UL slot 422b, and the third semi-persistently configured UL slot 422c corresponds to the first slot pattern 404, in that these slots are indicated for UL according to the use of the first slot pattern 404 within the repetitions of the slot configuration 402 in the TDD communications 420, according to an SP configuration. It can also be seen (with reference back to the SFI DCI 408 of FIG. 4A) that the first semi-persistently configured UL slot 422a corresponds to the UL slot indication from the SFI DCI 408 that was used to generate the first slot pattern 404, according to an SP configuration, while the second semi-persistently configured UL slot 422b and the third semi-persistently configured UL slot 422c correspond instead to the SIB/RRC slot configuration 406 (e.g., each correspond to one of a common configuration and a (possible) dedicated configuration underlying the SIB/RRC slot configuration 406).

Finally, each period of a UL gap periodicity may use the same arrangement (according to a use of initial semi-persistently configured UL slots of period for an UL gap) as the period 426b. This is illustrated in reference to the UL slots 432 of the period 426a (which are UL slots for regular UL transmission, presuming that semi-persistently configured UL slots for UE calibration occurred previously during the period 426a), the fourth semi-persistently configured UL slot 424a, the fifth semi-persistently configured UL slot 424b, and the sixth semi-persistently configured UL slot 424c (which may be the three initial semi-persistently configured UL slots of the period 426c to be used for UE calibration instead of for regular UL transmission) and the UL slot 430 (which is a UL slot of period 426c for regular UL transmission).

Persons of ordinary skill in the art, with the benefit of this disclosure, would understand that the use slot patterns configured according to a first hierarchical part, optionally a second hierarchical part, and a third hierarchical part of an SP configuration (an example of which has been presented in relation to the embodiment of FIG. 4A and FIG. 4B) could be extended into embodiments involving more than one configured slot pattern (analogously to content presented in relation to the embodiments of FIG. 2A and FIG. 2B herein). For example, it may be that a slot configuration corresponds to first slot pattern of length P and second slot pattern of length $P_2$, giving the slot configuration a length of $P+P_2$, and that one (or both) of such slot patterns is configured according to a first hierarchical part, optionally a second hierarchical part, and a third hierarchical part of an SP configuration. In such a case, repetitions of such a slot configuration may be initialized such that the first symbol of every $20/(P+P_2)$ repetitions of the slot configuration is a first symbol in an even numbered radio frame, that the UE may determine a UL gap periodicity that is a multiple of the first slot pattern and the second slot pattern (denoted as $N(P+P_2)$) and that accordingly comprises repetitions of the slot configuration, and that the UE may be able to identify the location(s) of one (or more) of those periods of the UL gap periodicity by using a received offset and the formula (SFN×10+SubFN)mod(UL gap periodicity)=Offset, but with UL gap periodicity=$N(P+P_2)$.

Then, as described herein, initial semi-persistently configured UL slots of such a period may be used for UE calibration. The number of these semi-persistently configured UL slots may be equal to the UL gap length. Further, these semi-persistently configured UL slots may correspond to slots indicated for UL in one or more of the first slot pattern and the second slot pattern. Each of these semi-persistently configured UL slot may correspond to one of a UL slot indication in a common configuration for the respective slot pattern, in a dedicated configuration for the respective slot pattern (if such was provided in relation to the slot pattern), or in an SFI DCI (if such was provided in relation to the slot pattern), according to an SP configuration.

Figure 5A:
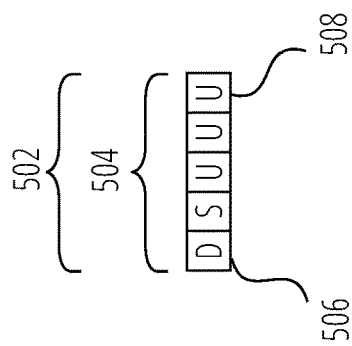
FIG. 5A illustrates a slot configuration used during TDD communications, according to an embodiment.

FIG. 5A illustrates a slot configuration 502 used during TDD communications, according to an embodiment. The slot configuration 502 includes the first slot pattern 504. As illustrated, the first slot pattern 504 is that of one downlink slot followed by a special slot followed by three uplink slots. The first slot pattern 504 may have been configured according to, for example, an SP configuration method, as described above.

The length of the first slot pattern 504 (in time) may be provided in configuration information for the first slot pattern 504 (e.g., as a 'dl-UL-TransmissionPeriodicity' parameter), and may be denoted herein as P. As illustrated, in the embodiment of FIG. 5A through FIG. 5D, because the slot configuration 502 is coextensive with the first slot pattern 504, the length of the slot configuration 502 may also be understood by the UE to be P.

As will be described herein, each of FIG. 5B through FIG. 5D may use the elements illustrated in FIG. 5A. Accordingly, the embodiments of FIG. 5B, FIG. 5C, and FIG. 5D each use the slot configuration 502 that is coextensive with a single slot pattern (the first slot pattern 504). Accordingly, the embodiment of FIG. 5A, FIG. 5B, and FIG. 5C may each be analogous in many ways to the embodiment of FIG. 1A and FIG. 1B, which shares the same characteristic. Accordingly, it should be understood, for example, that the repetitions of the slot configuration 502 illustrated in the respective TDD communications of these figures may be initialized such that the first symbol of every 20/P repetitions of the slot configuration 502 is a first symbol in an even numbered radio frame, that the UE may determine a UL gap periodicity that is a multiple of the first slot pattern 504 (denoted herein as NP), and that the UE may be able to identify the location(s) of one (or more) of the periods of the UL gap periodicities shown in these figures by using a received offset and the formula (SFN×10+SubFN)mod(UL gap periodicity)=Offset (where UL gap periodicity=NP).

The UE may also determine a UL gap length (e.g., according to an indication of the UL gap length made by the base station to the UE). In the embodiments of FIG. 5B, FIG. and FIG. 5D, the UE has determined the UL gap length to be equal to four. Accordingly, during each period of a UL gap periodicity, four semi-persistently configured UL slots are used for UE calibration purposes.

Figure 5B:
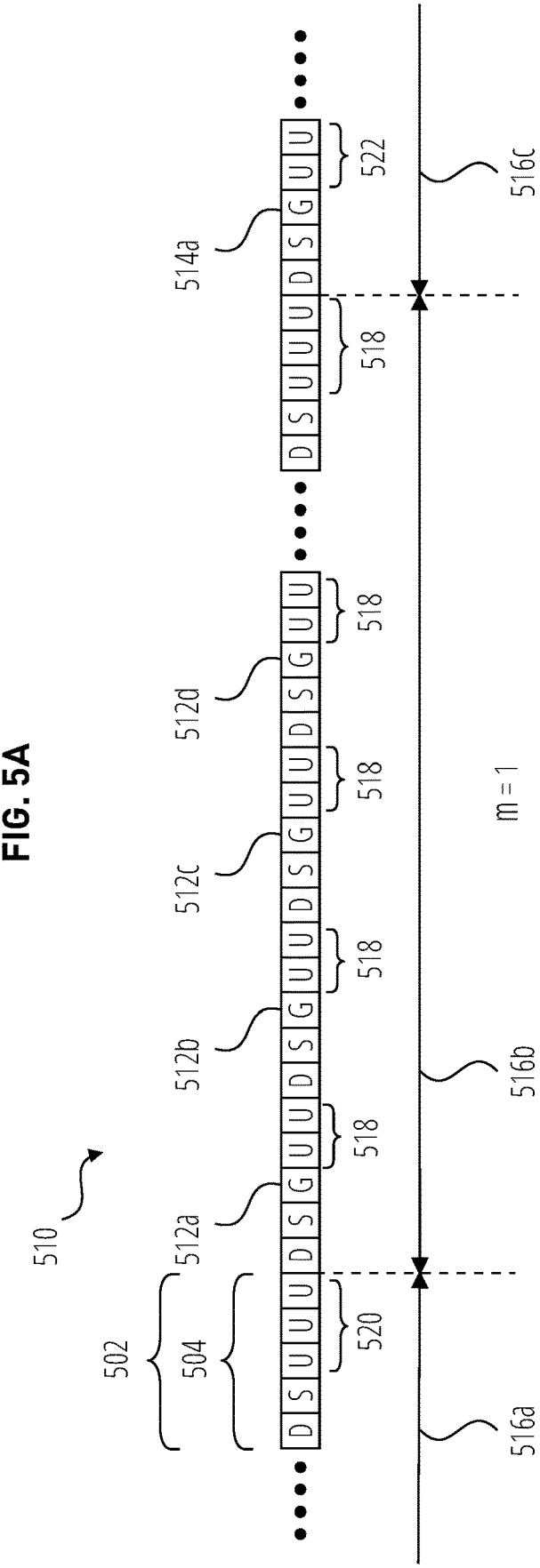
FIG. 5B illustrates a use of the slot configuration to perform TDD communications that use a UL gap, according to an embodiment.

However, in the embodiments of FIG. 5B, FIG. 5C, and FIG. 5D, the UL slots used for a UL gap are not (necessarily) the initial semi-persistently configured slots of the corresponding period of the UL gap periodicity, as in FIG. 1B, FIG. 2B, FIG. 3B, and FIG. 4B (though, as can be seen, there may be overlap). Instead, in the embodiments of FIG. 5B, FIG. 5C, and FIG. 5D, the UE uses one or more sets of initial semi-persistently configured UL slots of individual repetitions of a slot configuration used by a period of the UL gap periodicity. As used herein, reference to initial semi-persistently configured UL slots of a repetition of a slot configuration used by a period of the UL gap periodicity may be understood to refer to the initial (e.g., first) number of UL slots of that repetition of the slot configuration (as configured according to an SP configuration) as used by a period of a UL gap periodicity. Accordingly, in each of FIG. 5B, FIG. 5C, and FIG. 5D, for the UL gap, A UE uses (up to) a number in of initial semi-persistently configured UL slots of a repetition of the slot configuration of a period of the UL gap periodicity, and, if necessary, repeats this use in subsequent repetition(s) of the slot configuration within that period, until the total number of UL slots so used is equal to the UL gap length. This behavior may represent a "discontinuous UL slot use" for UE calibration. Accordingly, FIG. 5B may be understood to be one possible embodiment according to discontinuous UL slot use using elements from FIG. 5A, FIG. 5C may be understood to be a second possible embodiment according to discontinuous UL slot use using elements from FIG. 5A, and FIG. 5D may be understood to be a third possible embodiment according to discontinuous UL slot use using elements from FIG. 5A.

FIG. 5B illustrates a use of the slot configuration 502 to perform TDD communications 510 that use a UL gap, according to an embodiment. As illustrated, the TDD communications 510 proceed according to repetitions of the slot configuration 502 (which is made up of the first slot pattern 504).

The use of a number m of initial semi-persistently configured UL slots of repetitions of the slot configuration in a period of a UL gap periodicity is illustrated in FIG. 5B (in part) in relation to the four semi-persistently configured UL slots 512a, 512b, 512c and 512d of the period 516b corresponding to the UL gap periodicity, where m=1. Note that the first semi-persistently configured UL slot 512a, the second semi-persistently configured UL slot 512b, the third semi-persistently configured UL slot 512c, and the fourth semi-persistently configured UL slot 512d have each been denoted 'G' (corresponding to the fact that the UE will use each such UL slot as a UL gap for UE calibration) instead of 'U' (which might correspond to use of the slot by the UE for regular UL transmission). Further, as shown, UL slots within the period 516b that are not these semi-persistently configured UL slots (such as the UL slots 518), denoted 'U', remain available for regular UL transmissions.

As can be seen, each of the first semi-persistently configured UL slot 512a, the second semi-persistently configured UL slot 512b, the third semi-persistently configured UL slot 512c, and the fourth semi-persistently configured UL slot 512d correspond to the first slot pattern 504, in that these slots are indicated for UL according to the use of the first slot pattern 504 within the repetitions of the slot configuration 502 in the TDD communications 510. Further, each of the first semi-persistently configured UL slot 512a, the second semi-persistently configured UL slot 512b, the third semi-persistently configured UL slot 512c, and the fourth semi-persistently configured UL slot 512d may correspond to UL slot indications of a common configuration, a dedicated configuration, or an SFI DCI, according to an SP configuration (as described previously).

In the embodiment of FIG. 5B, the UE uses (up to) one (corresponding to m=1) initial semi-persistent UL slot in each repetition of the slot configuration 502 in the period 516b for a UL gap, until the UL gap length of four is reached. For example, as illustrated, the first semi-persistently configured UL slot 512a is an initial semi-persistent UL slot of a first repetition of the slot configuration 502 in the period 516b, the second semi-persistently configured UL slot 512b is an initial semi-persistent UL slot of a second repetition of the slot configuration 502 in the period 516b, the third semi-persistently configured UL slot 512c is an initial semi-persistent UL slot of a third repetition of the slot configuration 502 in the period 516a, and the fourth semi-persistently configured UL slot 512d is an initial semi-persistent UL slot of a fourth repetition of the slot configuration 502 in the period 516b.

Finally, each period of a UL gap periodicity in FIG. 5B may use the same arrangement as the period 516b. This is illustrated in reference to the UL slots 520 of the period 516a (which are UL slots for regular UL transmission, presuming that four semi-persistently configured UL slots for UE calibration occurred previously during the period 516a), and the fifth semi-persistently configured UL slot 514a (which may be an initial semi-persistent UL slot of a repetition of the slot configuration 502 in the period 516c to be used for UE calibration instead of for regular UL transmission) and the UL slots 522 (which are UL slots of period 516c for regular UL transmission) of the period 516c.

FIG. 5C illustrates a use of the slot configuration 502 to perform TDD communications 524 that use a UL gap, according to an embodiment. As illustrated, the TDD communications 524 proceed according to repetitions of the slot configuration 502 (which is made up of the first slot pattern 504).

The use of a number m of initial semi-persistently configured UL slots of repetitions of the slot configuration in a period of a UL gap periodicity is illustrated in FIG. 5C (in part) in relation to the four semi-persistently configured UL slots 526a, 526b, 526c and 526d of the period 530b corresponding to the UL gap periodicity, where m=2. Note that the first semi-persistently configured UL slot 526a, the second semi-persistently configured UL slot 526b, the third semi-persistently configured UL slot 526c, and the fourth semi-persistently configured UL slot 526d have each been denoted 'G' (corresponding to the fact that the UE will use each such UL slot as a UL gap for UE calibration) instead of 'U' (which might correspond to use of the slot by the UE for regular UL transmission). Further, as shown, UL slots within the period 530b that are not these semi-persistently configured UL slots (such as the UL slots 532), denoted 'U', remain available for regular UL transmissions.

As can be seen, each of the first semi-persistently configured UL slot 526a, the second semi-persistently configured UL slot 526b, the third semi-persistently configured UL slot 526c, and the fourth semi-persistently configured UL slot 526d correspond to the first slot pattern 504, in that these slots are indicated for UL according to the use of the first slot pattern 504 within the repetitions of the slot configuration 502 in the TDD communications 524. Further, each of the first semi-persistently configured UL slot 526a, the second semi-persistently configured UL slot 526b, the third semi-persistently configured UL slot 526c, and the fourth semi-persistently configured UL slot 526d may correspond to UL slot indications of a common configuration, a dedicated configuration, or an SFI DCI, according to an SP configuration (as described previously).

In the embodiment of FIG. 5C, the UE uses (up to) two (corresponding to m=2) initial semi-persistent UL slots of each repetition of the slot configuration 502 in the period 530b for a UL gap, until the UL gap length of four is reached. For example, as illustrated, the first semi-persistently configured UL slot 526a and the second semi-persistently configured UL slot 526b are initial semi-persistent UL slots of a first repetition of the slot configuration 502 in the period 530b, and the third semi-persistently configured UL slot 526c and the fourth semi-persistently configured UL slot 526d are initial semi-persistent UL slots of a second repetition of the slot configuration 502 in the period 530b.

Finally, each period of the UL gap periodicity may use the same arrangement as the period 530b. This is illustrated in reference to the UL slots 534 of the period 530a (which are UL slots for regular UL transmission, presuming that four semi-persistently configured UL slots for UE calibration occurred previously during the period 530a), and the fifth semi-persistently configured UL slot 528a and the sixth semi-persistently configured UL slot 528b (which may each be an initial semi-persistent UL slot of a first repetition of the slot configuration 502 in the period 530c to be used for UE calibration instead of for regular UL transmission) and the UL slot 536 (which is a UL slot of period 530c for regular UL transmission) of the period 530c.

FIG. 5D illustrates a use of the slot configuration 502 to perform TDD communications 538 that use a UL gap, according to an embodiment. As illustrated, the TDD communications 538 proceed according to repetitions of the slot configuration 502 (which is made up of the first slot pattern 504).

The use of a number 7n, of initial semi-persistently configured UL slots of repetitions of the slot configuration in a period of a UL gap periodicity is illustrated in FIG. 5D (in part) in relation to the four semi-persistently configured UL slots 540a, 540b, 540c and 540d of the period 544b of the corresponding UL gap periodicity, where m=3. Note that the first semi-persistently configured UL slot 540a, the second semi-persistently configured UL slot 540b, the third semi-persistently configured UL slot 540c, and the fourth semi-persistently configured UL slot 540d have each been denoted 'G' (corresponding to the fact that the UE will use each such UL slot as a UL gap for UE calibration) instead of 'U' (which might correspond to use of the slot by the UE for regular UL transmission). Further, as shown, UL slots within the period 530b that are not these semi-persistently configured UL slots (such as the UL slots 546), denoted 'U', remain available for regular UL transmissions.

As can be seen, each of the first semi-persistently configured UL slot 540a, the second semi-persistently configured UL slot 540b, the third semi-persistently configured UL slot 540c, and the fourth semi-persistently configured UL slot 540d correspond to the first slot pattern 504, in that these slots are indicated for UL according to the use of the first slot pattern 504 within the repetitions of the slot configuration 502 in the TDD communications 538. Further, each of the first semi-persistently configured UL slot 540a, the second semi-persistently configured UL slot 540b, the third semi-persistently configured UL slot 540c, and the fourth semi-persistently configured UL slot 540d may correspond to UL slot indications of a common configuration, a dedicated configuration, or an SFI DCI, according to an SP configuration (as described previously).

In the embodiment of FIG. 5D, the UE uses (up to) three (corresponding to m=3) initial semi-persistent UL slots in each repetition of the slot configuration 502 in the period 530b for a UL gap, until the UL gap length of four is reached. For example, as illustrated, the first semi-persistently configured UL slot 540a, the second semi-persistently configured UL slot 540b, and the third semi-persistently configured UL slot 540c are initial semi-persistent UL slots of a first repetition of the slot configuration 502 in the period 544b, and the fourth semi-persistently configured UL slot 540d is an initial semi-persistent UL slot of a second repetition of the slot configuration 502 in the period 544b (where only one such slot was used in the second repetition because the UL gap length of 4 is reached with the use of the fourth semi-persistently configured UL slot 540d).

Finally, each period of the UL gap periodicity may use the same arrangement as the period 544b. This is illustrated in reference to the UL slots 548 of the period 544a (which are UL slots for regular UL transmission, presuming that four semi-persistently configured UL slots for UE calibration occurred previously during the period 544a), and the fifth semi-persistently configured UL slot 542a, the sixth semi-persistently configured UL slot 542b, and the seventh semi-persistently configured UL slot 542c (which may each be an initial semi-persistent UL slot of a first repetition of the slot configuration 502 in the period 544c to be used for UE calibration instead of for regular UL transmission) of the period 544c.

In embodiments implementing discontinuous UL slot use (such as those shown in FIG. 5B, FIG. 5C, and FIG. 5D), the of a given number m of initial semi-persistent UL slots of applicable repetitions of the slot configuration 502 used by the period 516b may be according to a preconfiguration of the UE. In other embodiments, the in may instead be signaled to the UE by the base station.

Further, it may be understood that the value of in in such embodiments is to be kept within certain constraints. For example, it may be understood that the value of in should be less than the UL gap length, and that the value of m should be less than or equal to the number of semi-persistently configured UL slots within a period of the UL gap periodicity.

Persons of ordinary skill in the art, with the benefit of this disclosure, would understand that the use of slot patterns discussed in FIG. 5A through FIG. 5D could be extended into embodiments involving more than one configured slot pattern (analogously to content presented in relation to the embodiments of FIG. 2A and FIG. 2B herein). For example, it may be that a slot configuration corresponds to first slot pattern of length P and second slot pattern of length $P_2$, giving the slot configuration a length of $P+P_2$ according to an SP configuration. In such a case, repetitions of such a slot configuration may be initialized such that the first symbol of every $20/(P+P_2)$ repetitions of the slot configuration is a first symbol in an even numbered radio frame, that the UE may determine a UL gap periodicity that is a multiple of the first slot pattern and the second slot pattern (denoted as $N(P+P_2)$) and that accordingly comprises repetitions of the slot configuration, and that the UE may be able to identify the location(s) of one (or more) of those periods of the UL gap periodicity by using a received offset and the formula (SFN×10+SubFN)mod(UL gap periodicity)=Offset, but with UL gap periodicity=$N(P+P_2)$.

Then, as described herein, initial semi-persistently configured UL slots of repetitions of a slot configuration within a period may be used for UE calibration. The number of these semi-persistently configured UL slots may be equal to the UL gap length. Further, these semi-persistently configured UL slots may correspond to slots indicated for UL in one or more of the first slot pattern and the second slot pattern. For example, in cases where a value of m that exceeds the number of semi-persistently configured UL slots of a repetition of a slot configuration that correspond to the first slot pattern, use of (initial) semi-persistent UL slots of that repetition of the slot configuration that correspond to the second slot pattern may be used to reach m. The semi-persistently configured UL slots may also each also be understood to correspond to a UL slot indication in a common configuration for the respective slot pattern, optionally in a dedicated configuration for the respective slot pattern (if such was provided in relation to the slot pattern), or optionally an SFI DCI, as appropriate, according to an SP configuration.

FIG. 1A through FIG. 5B have described embodiments using slot configurations determined according to SP configuration methods. It is contemplated that one or more slot configurations discussed relative to FIG. 1A through FIG. 5B could also (further) be temporarily changed within TDD communications by the base station via the use of dynamic DCI (e.g., dynamic scheduling DCI).

In the case of dynamic DCI, it may be, for example, that in the case that the UE is not configured with/by a SlotFormatIndicator element, and during the flexible symbols configured according to a common configuration (and a dedicated configuration, if used), the UE may a receive physical downlink control channel (PDSCH) or a channel state information reference signal (CSI-RS) in the flexible symbols of a slot if the UE receives a corresponding indication by a DCI format 1_0, DCI format 1_1, or a DCI format 0_1. Alternatively, in such cases, the UE may receive a physical uplink shared channel (PUSCH), a physical uplink control channel (PUCCH), a physical random access channel (PRACH), or a sounding reference signal (SRS) in the flexible symbols of a slot if the UE receives a corresponding indication by a DCI format 0_0, DCI format 0_1, DCI format 1_0, DCI format 1_1, or DCI format 2_3. Such examples of dynamic DCI may operate to dynamically configure a slot for UL use according to a UL slot indication found in the dynamic DCI.

Figure 6A:
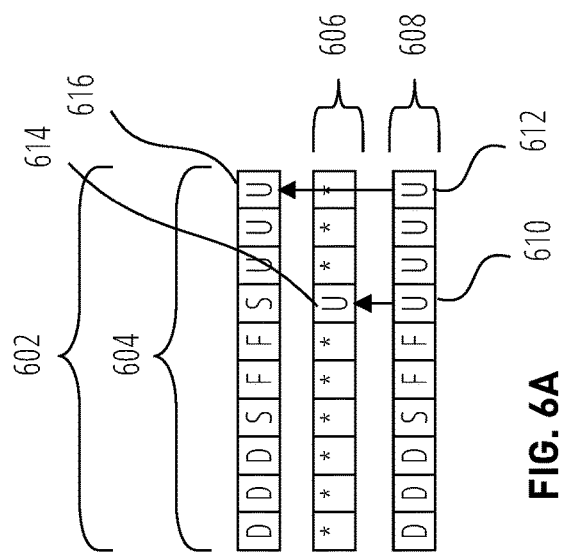
FIG. 6A illustrates a slot configuration used during TDD communication, according to an embodiment.

FIG. 6A illustrates a slot configuration 602 used during TDD communication, according to an embodiment. The slot configuration 602 includes the first slot pattern 604. As illustrated, the first slot pattern 604 is that of three downlink slots followed by a special slot followed by two flexible slots followed by a special slot followed by three uplink slots.

The slot configuration 602 may be determined according to SP configuration methods (e.g., as described in relation to the embodiments disclosed in FIG. 1A through FIG. 5B). For example, the slot configuration 602 may have been determined according to a first hierarchical part, (optionally) by a second hierarchical part of an SP configuration (e.g., as these may be received in SIB and/or RRC configuration information from the base station) and (optionally) a third hierarchical part of an SP configuration (as this may be received in an SFI DCI).

Then, the UE may receive the dynamic DCI 606. In such a case, the modified slot configuration 608 determined through the use of the dynamic DCI 606 to further specify flexible symbols/slots of the slot configuration 602 (or, in other embodiments, to override one or more symbols/slots of the slot configuration 602). For example, the dynamic DCI 606 may make the UL slot indication 614 corresponding to the location of the second special slot, as configured by the slot configuration 602, indicating that the UL slot 610 of the modified slot configuration 608 should instead have a slot format of all uplink symbols. Making the change to that slot as indicated by the dynamic DCI 606 results in the modified slot configuration 608.

It may be said that the slot configuration 602 is made up of slots (in the manner of slot configurations previously described). It may also be said that the modified slot configuration 608 is made up of slots that each correspond to a slot of the slot configuration 602 or a slot indication in the dynamic DCI 606. For example, the modified slot configuration 608 may be made of the UL slot 610 and the UL slot 612 (along with other slots, as illustrated). As illustrated, the UL slot 610 corresponds to a UL slot indication of the dynamic DCI 606 for that same position (as indicated by an arrow up from the UL slot 610 to the UL slot indication 614 of the dynamic DCI 606), while the UL slot 612 corresponds to a UL slot of the slot configuration 602 for that same position (as indicated by an arrow up from the UL slot 612 to the UL slot 616 of the slot configuration 602).

The length of the first slot pattern 604 (in time) may be provided in configuration information for the first slot pattern 604 (e.g., as a 'dl-UL-TransmissionPeriodicity' parameter), and may be denoted herein as P. As illustrated, in the embodiment of FIG. 6A and FIG. 6B, because the slot configuration 602 (and thus modified slot configuration 608) is coextensive with the first slot pattern 604, the length of the slot configuration 602 (and the modified slot configuration 608) may also be understood by the UE to be P.

Figure 6B:
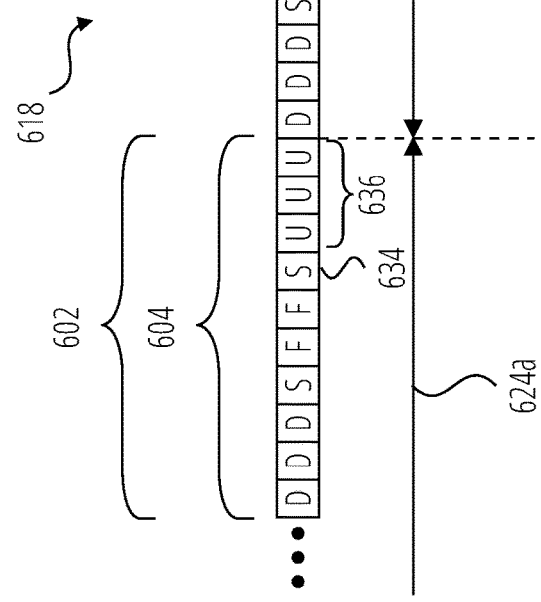
FIG. 6B illustrates a use of the slot configuration to perform TDD communications that use a UL gap, according to an embodiment.

FIG. 6B illustrates a use of the slot configuration 602 to perform TDD communications 618 that use a UL gap, according to an embodiment. As illustrated, the TDD communications 618 proceed according to repetitions of the slot configuration 602 (which is made up of the first slot pattern 604).

The embodiment of FIG. 6A and FIG. 6B uses a slot configuration 602 that is coextensive with a single slot pattern (the first slot pattern 604). Accordingly, the embodiment of FIG. 6A and FIG. 6B may be analogous in many ways to the embodiment of FIG. 1A and FIG. 1B, which shares the same characteristic. Accordingly, it should be understood, for example, that the repetitions of the slot configuration 602/modified slot configuration 608 illustrated in the TDD communications 618 may be initialized such that the first symbol of every 20/P repetitions of the slot configuration 602/modified slot configuration 608 is a first symbol in an even numbered radio frame, that the UE may determine a UL gap periodicity that is a multiple of the first slot pattern 604 (denoted as NP), and that the UE may be able to identify the location(s) of one (or more) of the periods 624a, 624b, and/or 624c of the UL gap periodicity by using a received offset and the formula (SFN×10+SubFN)mod(UL gap periodicity)=Offset (where UL gap periodicity=NP).

The UE may also determine a UL gap length (e.g., according to an indication of the UL gap length made by the base station to the UE). In the embodiment of FIG. 6B, the UE has determined the UL gap length to be equal to three. Accordingly, at during each period 624a, 624b, and 624c of the UL gap periodicity, three semi-persistently configured UL slots are used for UE calibration purposes according to a UL gap. Note that these have been denoted 'G' (corresponding to the fact that the UE will use each such UL slot as a UL gap for UE calibration) instead of 'U' (which might correspond to use of the slot by the UE for regular UL transmission). For example, in FIG. 6B, the first semi-persistently configured UL slot 620a, the second semi-persistently configured UL slot 620b, and the third semi-persistently configured UL slot 620c (denoted 'G') may be used for UE calibration, while UL slots within the period 624b that are not used for UE calibration (such as the UL slot 626 and the UL slots 628), denoted 'U', remain available for regular UL transmissions.

FIG. 6B illustrates the use of a UL gap according to semi-persistently configured UL slots of a period (in part) in relation to the three initial semi-persistently configured UL slots 620a, 620b, and 620c of the period 624b of the UL gap periodicity. It can be seen (with reference back to the SFI DCI 408 of FIG. 4A) that no initial semi-persistently configured UL slot 620a, 620b, and 620c of the period 624b corresponds to the UL slot indication from the dynamic DCI 606 that was used to generate the modified slot configuration 608 (e.g., semi-persistently configured UL slots 620a, 620b, and 620c of the 624b do not include a UL slot corresponding to the UL slot indication from the dynamic DCI 606). Instead, each of the first semi-persistently configured UL slot 620a, second semi-persistently configured UL slot 620b, and third semi-persistently configured UL slot 620c corresponds to a UL slot provided according to the (original) slot configuration 602 (generated according to SP configuration methods).

Further, as can be seen, each of the first semi-persistently configured UL slot 620a, the second semi-persistently configured UL slot 620b, and the third semi-persistently configured UL slot 620c corresponds to the first slot pattern 604, in that these slots are indicated for UL according to the use of the first slot pattern 604 within the repetitions of the slot configuration 602 in the TDD communications 618.

By disregarding UL slot indications from dynamic DCI 606 in this manner, unfavorable network impacts that could otherwise occur may be minimized. For example, it may be that the base station sends the UE the dynamic DCI 606 having the illustrated UL slot indication 614 as a result of the base station requiring data from the UE that is latency sensitive. In such a case, interrupting the resulting UL slot 626 of the period 624b in order to perform UE calibration (instead of using that slot to send the regular, latency sensitive data) may cause the latency sensitive data to arrive late at the base station.

Note that due to the transitory nature of dynamic DCI configurations, previous and/or subsequent repetitions of a slot configuration within the period 624b may occur according to the original slot configuration 602, and not according to the modified slot configuration 608. This is illustrated, for example, in reference to the special slot 630 of the period 624b (which is not a UL slot as it would otherwise be if the corresponding repetition were to match the modified slot configuration 608).

Further, periods of the UL gap periodicity that are not affected by dynamic DCI changes, such as the period 624a and the period 624c, may (also) use a UL gap corresponding to the (original) slot configuration 602. This is illustrated by the special slot 634 and the UL slots 636 (which are UL slots for regular UL transmission, presuming that three semi-persistently configured UL slots for UE calibration occurred previously during the period 624a) of the period 624a, and the special slot 632 and the fourth semi-persistently configured UL slot 622a, the fifth semi-persistently configured UL slot 622b, and the sixth semi-persistently configured UL slot 622c (which may be the three initial semi-persistently configured UL slots of the period 624c to be used for UE calibration instead of for regular UL transmission) of the period 624c.

While the embodiment of FIG. 6B assumes a use of a UL gap according to initial semi-persistently configured UL slots of a period, it is contemplated that the details described in relation to FIG. 6B could also be applied in the case of a use of a UL gap according to initial semi-persistently configured UL slots of repetitions of the slot configuration in the period (as described in relation to FIG. 5A through FIG. 5D).

Persons of ordinary skill in the art, with the benefit of this disclosure, would understand that the use slot patterns configured according to a first hierarchical part, optionally a second hierarchical part, and a optionally third hierarchical part of an SP configuration, and as further modified according to a dynamic DCI (an example of which has been presented in relation to the embodiment of FIG. 6A and FIG. 6B) could be extended into embodiments involving more than one configured slot pattern (analogously to content presented in relation to the embodiments of FIG. 2A and FIG. 2B herein). For example, it may be that a slot configuration corresponds to first slot pattern of length P and second slot pattern of length $P_2$, giving the slot configuration a length of $P+P_2$, and that one (or both) of such slot patterns is configured according to a first hierarchical part, optionally a second hierarchical part, and a third hierarchical part of an SP configuration. In such a case, repetitions of such a slot configuration may be initialized such that the first symbol of every $20/(P+P_2)$ repetitions of the slot configuration is a first symbol in an even numbered radio frame, that the UE may determine a UL gap periodicity that is a multiple of the first slot pattern and the second slot pattern (denoted as $N(P+P_2)$) and that accordingly comprises repetitions of the slot configuration, and that the UE may be able to identify the location(s) of one (or more) of those periods of the UL gap periodicity by using a received offset and the formula (SFN×10+SubFN)mod(UL gap periodicity)=Offset, but with UL gap periodicity=$N(P+P_2)$.

Then, as described herein, semi-persistently configured UL slots of such a period may be used for UE calibration. The number of the semi-persistently configured UL slots may be equal to the UL gap length. Further, the semi-persistently configured UL slots may correspond to slots indicated for UL in one or more of the first slot pattern and the second slot pattern. Each semi-persistently configured UL slot may correspond to one of a UL slot indication in a common configuration for the respective slot pattern, in a dedicated configuration for the respective slot pattern (if such was provided in relation to the slot pattern), or in an SFI DCI (if such was provided in relation to the slot pattern), in accordance with an SP configuration. Further, any (temporary) slots of the first or second pattern corresponding to UL slot indications from any subsequent dynamic DCI (temporarily) affecting the first or second slot pattern may then be excluded from use for UL gap/UE calibration purposes (e.g., are not considered semi-persistently configured UL slots).

Figure 7:
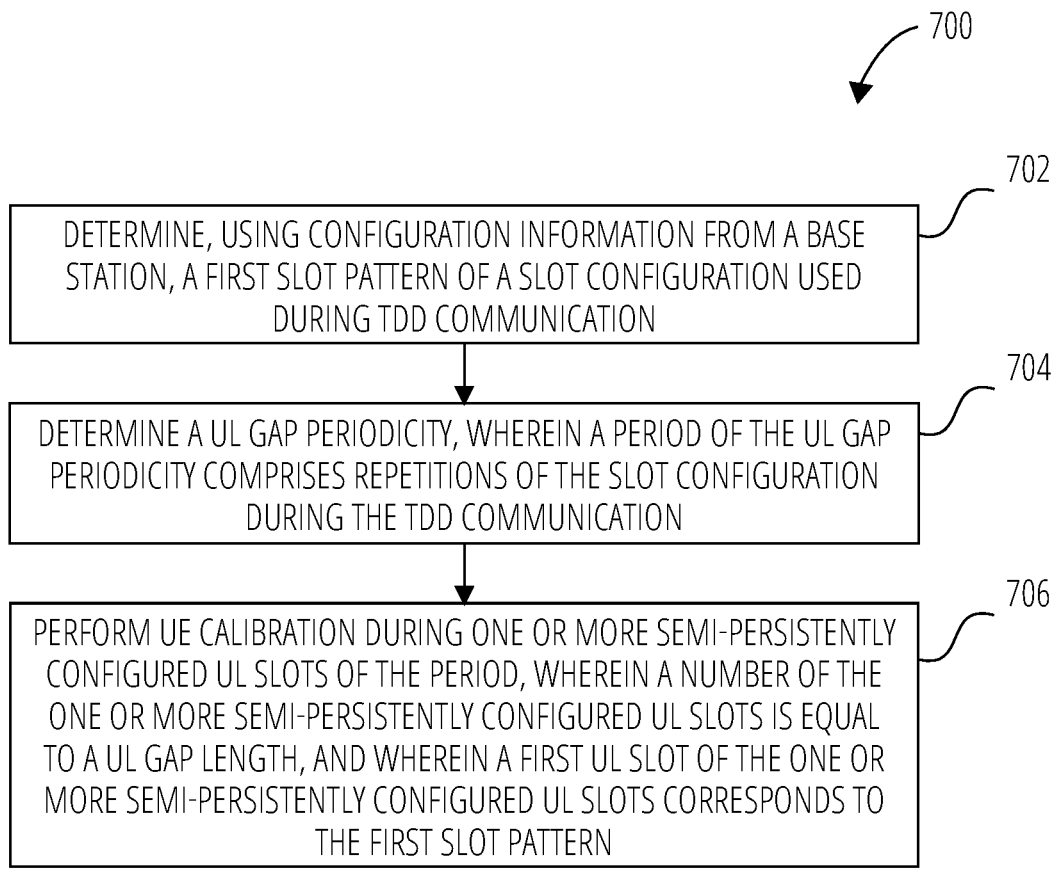
FIG. 7 illustrates a method of a UE, according to an embodiment.

FIG. 7 illustrates a method 700 of a UE, according to an embodiment. The method 700 includes determining 702, using configuration information from a base station, a first slot pattern of a slot configuration used during TDD communication. The TDD communication may be with the base station.

The method 700 further includes determining 704 a UL gap periodicity, wherein a period of the UL gap periodicity comprises repetitions of the slot configuration during the TDD communication.

The method 700 further includes performing 706 UE calibration during one or more semi-persistently configured UL slots of the period, wherein a number of the one or more semi-persistently configured UL slots is equal to a UL gap length, and wherein a first UL slot of the one or more semi-persistently configured UL slots corresponds to the first slot pattern.

In some embodiments of the method 700, the one or more semi-persistently configured UL slots are initial semi-persistently configured UL slots of the period.

In some embodiments of the method 700, the one or more semi-persistently configured UL slots are initial semi-persistently configured UL slots of the repetitions of the slot configuration.

In some embodiments, the method 700 further includes determining, using the configuration information, a second slot pattern of the slot configuration, wherein a second UL slot of the one or more semi-persistently configured UL slots corresponds to the second slot pattern.

In some embodiments of the method 700, the UL gap periodicity is a multiple of a length of the slot configuration.

In some embodiments, the method 700 further includes receiving, from the base station, a number of the repetitions of the slot configuration of the UL gap periodicity, wherein determining the UL gap periodicity comprises multiplying a length of the slot configuration by a number of the repetitions. In some of these embodiments, the length of the slot configuration equals a length of the first slot pattern. In some of these embodiments, the length of the slot configuration equals a sum of a length of the first slot pattern plus a length of a second slot pattern of the slot configuration.

In some embodiments of the method 700, the configuration information includes a common configuration for all UE of a serving cell of the UE indicating the first slot pattern, and wherein the first UL slot corresponds to a first UL slot indication made in the common configuration. In some of these embodiments, the common configuration indicates a second slot pattern of the slot configuration, and a second UL slot of the one or more semi-persistently configured UL slots corresponds to a second UL slot indication made in the common configuration and to the second slot pattern.

In some embodiments of the method 700, the configuration information includes a first dedicated configuration for the first slot pattern that is specific to the UE, and the first UL slot corresponds to a first UL slot indication made in the first dedicated configuration. In some of these embodiments, the configuration information includes a second dedicated configuration for a second slot pattern of the slot configuration, and a second UL slot of the one or more semi-persistently configured UL slots corresponds to a second UL slot indication made in the second dedicated configuration.

In some embodiments of the method 700, the first slot pattern is further determined using first SFI DCI received from the base station, and the first UL slot corresponds to a first UL slot indication made in the first SFI DCI. In some of these embodiments, a second slot pattern of the slot configuration is determined using second SFI DCI received from the base station, and a second UL slot of the one or more semi-persistently configured UL slots corresponds to a second UL slot indication made in the second SFI DCI.

In some embodiments of the method 700, the one or more semi-persistently configured UL slots does not include a UL slot corresponding to a UL slot indication made by dynamic DCI.

In some embodiments of the method 700, the UL gap length is indicated to the UE by the base station.

Embodiments contemplated herein include an apparatus comprising means to perform one or more elements of the method 700. This apparatus may be, for example, an apparatus of a UE (such as a wireless device 902 that is a UE, as described herein).

Embodiments contemplated herein include one or more non-transitory computer-readable media comprising instructions to cause an electronic device, upon execution of the instructions by one or more processors of the electronic device, to perform one or more elements of the method 700. This non-transitory computer-readable media may be, for example, a memory of a UE (such as a memory 906 of a wireless device 902 that is a UE, as described herein).

Embodiments contemplated herein include an apparatus comprising logic, modules, or circuitry to perform one or more elements of the method 700. This apparatus may be, for example, an apparatus of a UE (such as a wireless device 902 that is a UE, as described herein).

Embodiments contemplated herein include an apparatus comprising: one or more processors and one or more computer-readable media comprising instructions that, when executed by the one or more processors, cause the one or more processors to perform one or more elements of the method 700. This apparatus may be, for example, an apparatus of a UE (such as a wireless device 902 that is a UE, as described herein).

Embodiments contemplated herein include a signal as described in or related to one or more elements of the method 700.

Embodiments contemplated herein include a computer program or computer program product comprising instructions, wherein execution of the program by a processor is to cause the processor to carry out one or more elements of the method 700. The processor may be a processor of a UE (such as a processor(s) 904 of a wireless device 902 that is a UE, as described herein). These instructions may be, for example, located in the processor and/or on a memory of the UE (such as a memory 906 of a wireless device 902 that is a UE, as described herein).

Figure 8:
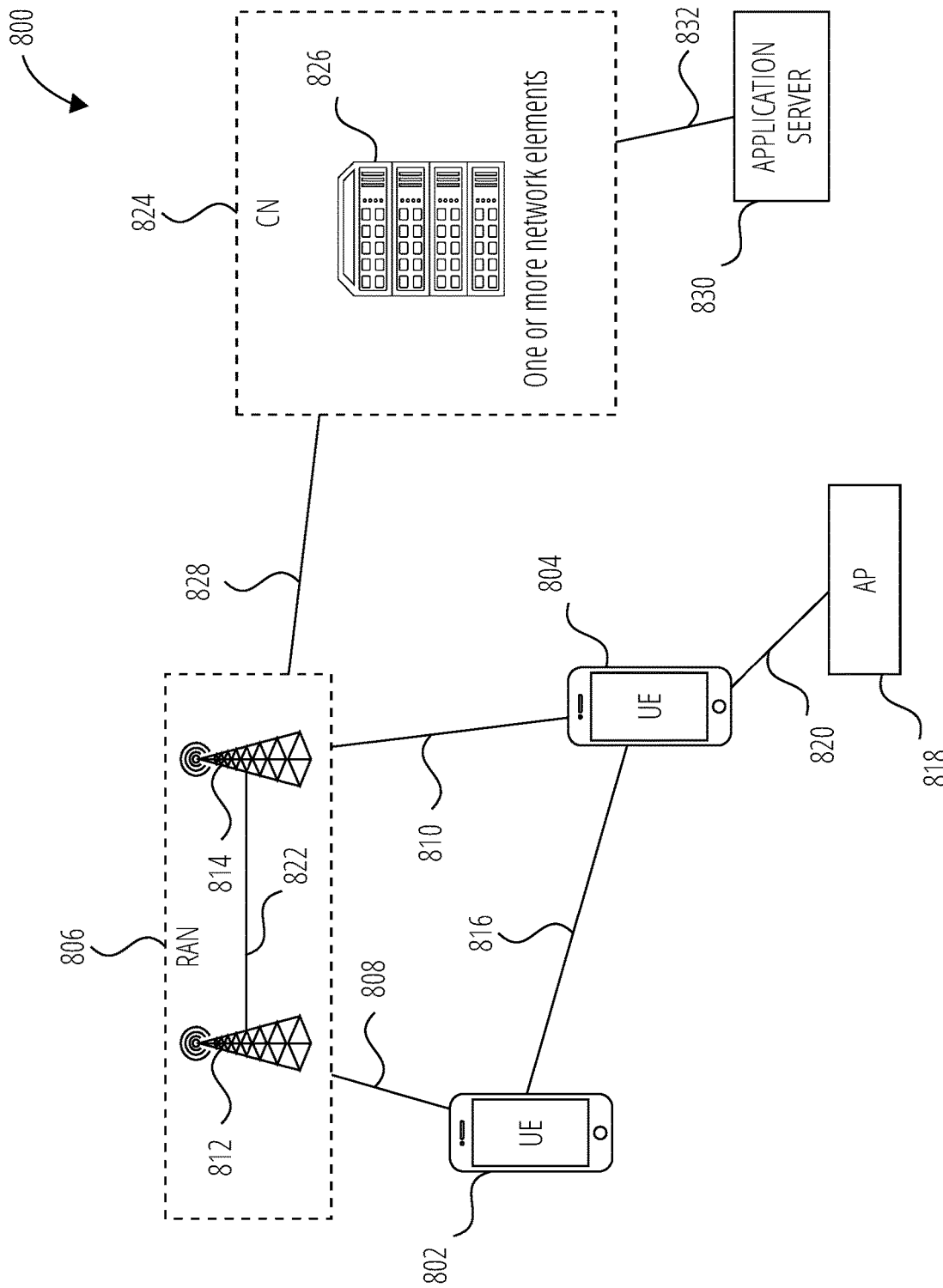
FIG. 8 illustrates an example architecture of a wireless communication system, according to embodiments disclosed herein.

FIG. 8 illustrates an example architecture of a wireless communication system 800, according to embodiments disclosed herein. The following description is provided for an example wireless communication system 800 that operates in conjunction with the LTE system standards and/or 5G or NR system standards as provided by 3GPP technical specifications.

As shown by FIG. 8, the wireless communication system 800 includes UE 802 and UE 804 (although any number of UEs may be used). In this example, the UE 802 and the UE 804 are illustrated as smartphones (e.g., handheld touch-screen mobile computing devices connectable to one or more cellular networks), but may also comprise any mobile or non-mobile computing device configured for wireless communication.

The UE 802 and UE 804 may be configured to communicatively couple with a RAN 806. In embodiments, the RAN 806 may be NG-RAN, E-UTRAN, etc. The UE 802 and UE 804 utilize connections (or channels) (shown as connection 808 and connection 810, respectively) with the RAN 806, each of which comprises a physical communications interface. The RAN 806 can include one or more base stations, such as base station 812 and base station 814, that enable the connection 808 and connection 810.

In this example, the connection 808 and connection 810 are air interfaces to enable such communicative coupling, and may be consistent with RAT(s) used by the RAN 806, such as, for example, an LTE and/or NR.

In some embodiments, the UE 802 and UE 804 may also directly exchange communication data via a sidelink interface 816. The UE 804 is shown to be configured to access an access point (shown as AP 818) via connection 820. By way of example, the connection 820 can comprise a local wireless connection, such as a connection consistent with any IEEE 702.11 protocol, wherein the AP 818 may comprise a Wi-Fi® router. In this example, the AP 818 may be connected to another network (for example, the Internet) without going through a CN 824.

In embodiments, the UE 802 and UE 804 can be configured to communicate using orthogonal frequency division multiplexing (OFDM) communication signals with each other or with the base station 812 and/or the base station 814 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 812 or base station 814 may be implemented as one or more software entities running on server computers as part of a virtual network. In addition, or in other embodiments, the base station 812 or base station 814 may be configured to communicate with one another via interface 822. In embodiments where the wireless communication system 800 is an LTE system (e.g., when the CN 824 is an EPC), the interface 822 may be an X2 interface. The X2 interface may be defined between two or more base stations (e.g., two or more eNBs and the like) that connect to an EPC, and/or between two eNBs connecting to the EPC. In embodiments where the wireless communication system 800 is an NR system (e.g., when CN 824 is a 5GC), the interface 822 may be an Xn interface. The Xn interface is defined between two or more base stations (e.g., two or more gNBs and the like) that connect to 5GC, between a base station 812 (e.g., a gNB) connecting to 5GC and an eNB, and/or between two eNBs connecting to 5GC (e.g., CN 824).

The RAN 806 is shown to be communicatively coupled to the CN 824. The CN 824 may comprise one or more network elements 826, which are configured to offer various data and telecommunications services to customers/subscribers (e.g., users of UE 802 and UE 804) who are connected to the CN 824 via the RAN 806. The components of the CN 824 may be implemented in one physical device or separate physical devices including components to read and execute instructions from a machine-readable or computer-readable medium (e.g., a non-transitory machine-readable storage medium).

In embodiments, the CN 824 may be an EPC, and the RAN 806 may be connected with the CN 824 via an S1 interface 828. In embodiments, the S1 interface 828 may be split into two parts, an S1 user plane (S 1-U) interface, which carries traffic data between the base station 812 or base station 814 and a serving gateway (S-GW), and the S1-MME interface, which is a signaling interface between the base station 812 or base station 814 and mobility management entities (MMEs).

In embodiments, the CN 824 may be a 5GC, and the RAN 806 may be connected with the CN 824 via an NG interface 828. In embodiments, the NG interface 828 may be split into two parts, an NG user plane (NG-U) interface, which carries traffic data between the base station 812 or base station 814 and a user plane function (UPF), and the S1 control plane (NG-C) interface, which is a signaling interface between the base station 812 or base station 814 and access and mobility management functions (AMFs).

Generally, an application server 830 may be an element offering applications that use internet protocol (IP) bearer resources with the CN 824 (e.g., packet switched data services). The application server 830 can also be configured to support one or more communication services (e.g., VoIP sessions, group communication sessions, etc.) for the UE 802 and UE 804 via the CN 824. The application server 830 may communicate with the CN 824 through an IP communications interface 832.

Figure 9:
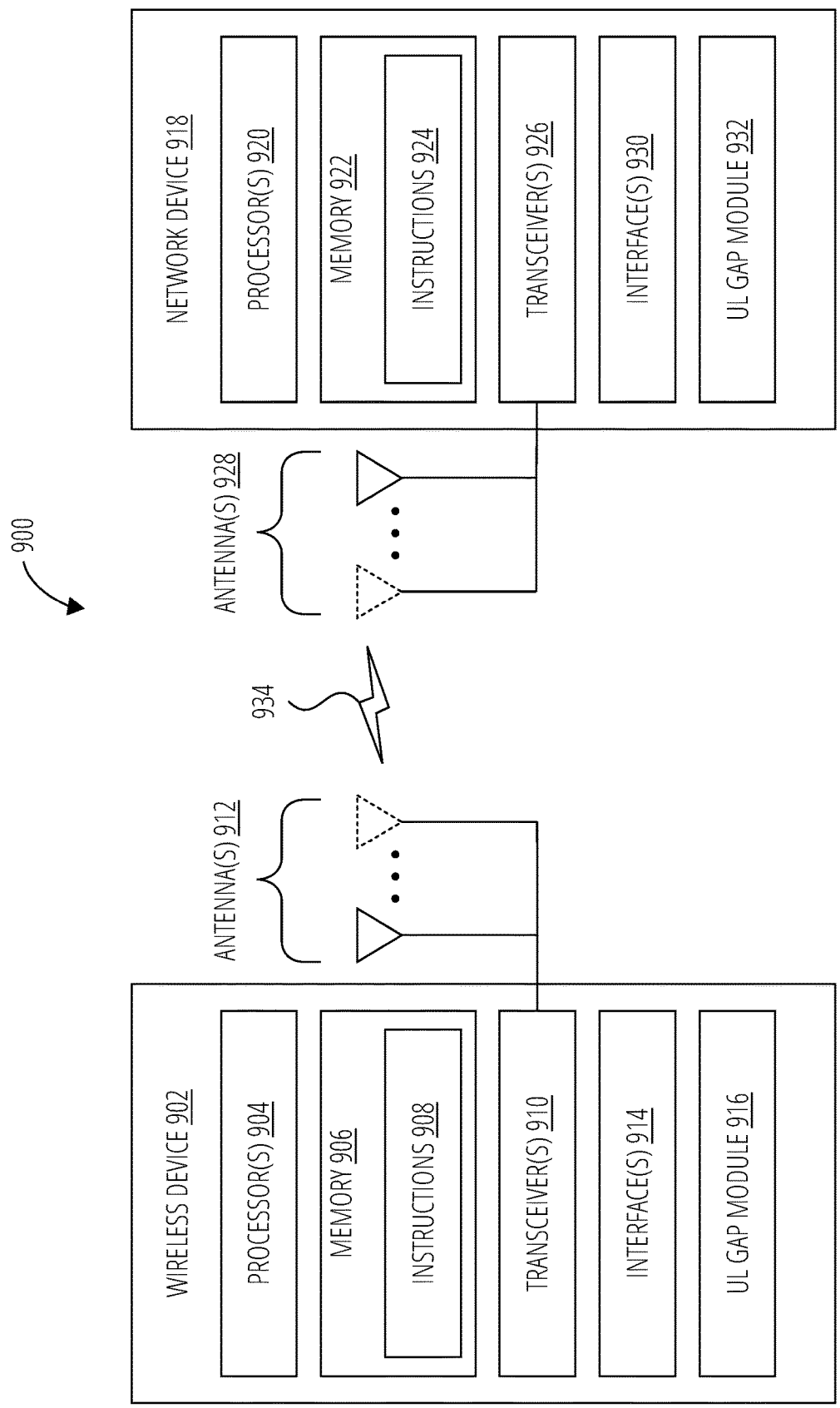
FIG. 9 illustrates a system for performing signaling between a wireless device and a network device, according to embodiments disclosed herein.

FIG. 9 illustrates a system 900 for performing signaling 934 between a wireless device 902 and a network device 918, according to embodiments disclosed herein. The system 900 may be a portion of a wireless communications system as herein described. The wireless device 902 may be, for example, a UE of a wireless communication system. The network device 918 may be, for example, a base station (e.g., an eNB or a gNB) of a wireless communication system.

The wireless device 902 may include one or more processor(s) 904. The processor(s) 904 may execute instructions such that various operations of the wireless device 902 are performed, as described herein. The processor(s) 904 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 902 may include a memory 906. The memory 906 may be a non-transitory computer-readable storage medium that stores instructions 908 (which may include, for example, the instructions being executed by the processor(s) 904). The instructions 908 may also be referred to as program code or a computer program. The memory 906 may also store data used by, and results computed by, the processor(s) 904.

The wireless device 902 may include one or more transceiver(s) 910 that may include radio frequency (RF) transmitter and/or receiver circuitry that use the antenna(s) 912 of the wireless device 902 to facilitate signaling (e.g., the signaling 934) to and/or from the wireless device 902 with other devices (e.g., the network device 918) according to corresponding RATs.

The wireless device 902 may include one or more antenna(s) 912 (e.g., one, two, four, or more). For embodiments with multiple antenna(s) 912, the wireless device 902 may leverage the spatial diversity of such multiple antenna(s) 912 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 902 may be accomplished according to precoding (or digital beamforming) that is applied at the wireless device 902 that multiplexes the data streams across the antenna(s) 912 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 902 may implement analog beamforming techniques, whereby phases of the signals sent by the antenna(s) 912 are relatively adjusted such that the (joint) transmission of the antenna(s) 912 can be directed (this is sometimes referred to as beam steering).

The wireless device 902 may include one or more interface(s) 914. The interface(s) 914 may be used to provide input to or output from the wireless device 902. For example, a wireless device 902 that is a UE may include interface(s) 914 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 910/antenna(s) 912 already described) that allow for communication between the UE and other devices and may operate according to known protocols (e.g., Wi-Fi®, Bluetooth®, and the like).

The wireless device 902 may include a UL gap module 916. The UL gap module 916 may be implemented via hardware, software, or combinations thereof. For example, the UL gap module 916 may be implemented as a processor, circuit, and/or instructions 908 stored in the memory 906 and executed by the processor(s) 904. In some examples, the UL gap module 916 may be integrated within the processor(s) 904 and/or the transceiver(s) 910. For example, the UL gap module 916 may be implemented by a combination of software components (e.g., executed by a DSP or a general processor) and hardware components (e.g., logic gates and circuitry) within the processor(s) 904 or the transceiver(s) 910.

The UL gap module 916 may be used for various aspects of the present disclosure, for example, aspects of FIG. 1A through FIG. 6B. For example, the UL gap module 916 may be configured to determine one or more slot patterns of a slot configuration used by the UE during TDD communications, determine a UL gap periodicity (e.g., as determined relative to the length(s) of the one or more slot patterns of the slot configuration), and instruct the UE to perform UE calibration during one or more semi-persistently configured UL slots of the period (e.g., that is equal in number to the gap length), where the semi-persistently configured UL slots each correspond to one of the slot pattern(s) (e.g., correspond to a UL slot indication of one of a common configuration, a dedicated configuration, or an SFI DCI for the corresponding slot pattern).

The network device 918 may include one or more processor(s) 920. The processor(s) 920 may execute instructions such that various operations of the network device 918 are performed, as described herein. The processor(s) 904 may include one or more baseband processors implemented using, for example, a CPU, a DSP, an ASIC, a controller, an FPGA device, another hardware device, a firmware device, or any combination thereof configured to perform the operations described herein.

The network device 918 may include a memory 922. The memory 922 may be a non-transitory computer-readable storage medium that stores instructions 924 (which may include, for example, the instructions being executed by the processor(s) 920). The instructions 924 may also be referred to as program code or a computer program. The memory 922 may also store data used by, and results computed by, the processor(s) 920.

The network device 918 may include one or more transceiver(s) 926 that may include RF transmitter and/or receiver circuitry that use the antenna(s) 928 of the network device 918 to facilitate signaling (e.g., the signaling 934) to and/or from the network device 918 with other devices (e.g., the wireless device 902) according to corresponding RATs.

The network device 918 may include one or more antenna(s) 928 (e.g., one, two, four, or more). In embodiments having multiple antenna(s) 928, the network device 918 may perform MIMO, digital beamforming, analog beamforming, beam steering, etc., as has been described.

The network device 918 may include one or more interface(s) 930. The interface(s) 930 may be used to provide input to or output from the network device 918. For example, a network device 918 that is a base station may include interface(s) 930 made up of transmitters, receivers, and other circuitry (e.g., other than the transceiver(s) 926/antenna(s) 928 already described) that enables the base station to communicate with other equipment in a core network, and/or that enables the base station to communicate with external networks, computers, databases, and the like for purposes of operations, administration, and maintenance of the base station or other equipment operably connected thereto.

The network device 918 may include a UL gap module 932. The UL gap module 932 may be implemented via hardware, software, or combinations thereof. For example, the UL gap module 932 may be implemented as a processor, circuit, and/or instructions 924 stored in the memory 922 and executed by the processor(s) 920. In some examples, the UL gap module 932 may be integrated within the processor(s) 920 and/or the transceiver(s) 926. For example, the UL gap module 932 may be implemented by a combination of software components (e.g., executed by a DSP or a general processor) and hardware components (e.g., logic gates and circuitry) within the processor(s) 920 or the transceiver(s) 926.

The UL gap module 932 may be used for various aspects of the present disclosure, for example, aspects of FIG. 1A through FIG. 6B. For example, the UL gap module 932 may be configured to cause the network device 918 to indicate to a UE whether to use UL gap length determinations in the manner described here, and/or whether the network device 918 expects the UE to use such determinations. The UL gap module 932 may also cause the network device 918 to provide a UL gap length to the UE in certain embodiments. The UL gap module 932 may also cause the network device 918 to provide an offset value (for determining the location of a period of a UL gap periodicity) to the UE in certain embodiments. The UL gap module 932 may also cause the network device 918 to provide a number m of initial semi-persistently configured UL slots of repetition(s) of the slot configuration of a period of the UL gap periodicity to the UE in certain embodiments. Further, the UL gap module 932 may cause the network device 918 to determine, for example, common configurations, dedicated configurations, and/or SFI DCI indications to the UE in light of the expectation that the UE is using UL gap length determinations as described herein.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a user equipment (UE) that performs time division duplex (TDD) communication with a base station, comprising:
   determining, using configuration information from the base station, a first slot pattern of a slot configuration used during the TDD communication;
   determining an uplink (UL) gap periodicity, wherein a period of the UL gap periodicity comprises repetitions of the slot configuration during the TDD communication; and
   performing UE calibration during a plurality of semi-persistently configured UL slots of the period, wherein a number of the plurality of semi-persistently configured UL slots is equal to a UL gap length, and wherein a first UL slot of the plurality of semi-persistently configured UL slots corresponds to the first slot pattern.

2. The method of claim 1, wherein the plurality of semi-persistently configured UL slots are initial semi-persistently configured UL slots of the period.

3. The method of claim 1, wherein the plurality of semi-persistently configured UL slots are initial semi-persistently configured UL slots of the repetitions of the slot configuration.

4. The method of claim 1, further comprising determining, using the configuration information, a second slot pattern of the slot configuration, wherein a second UL slot of the plurality of semi-persistently configured UL slots corresponds to the second slot pattern.

5. The method of claim 1, wherein the UL gap periodicity is a multiple of a length of the slot configuration.

6. The method of claim 1, further comprising receiving, from the base station, a number of the repetitions of the slot configuration of the UL gap periodicity, wherein determining the UL gap periodicity comprises multiplying a length of the slot configuration by a number of the repetitions.

7. The method of claim 6, wherein the length of the slot configuration equals a length of the first slot pattern.

8. The method of claim 6, wherein the length of the slot configuration equals a sum of a length of the first slot pattern plus a length of a second slot pattern of the slot configuration.

9. The method of claim 1, wherein the configuration information includes a common configuration for all UE of a serving cell of the UE indicating the first slot pattern, and wherein the first UL slot corresponds to a first UL slot indication made in the common configuration.

10. The method of claim 9, wherein the common configuration indicates a second slot pattern of the slot configuration, and wherein a second UL slot of the plurality of semi-persistently configured UL slots corresponds to a second UL slot indication made in the common configuration and to the second slot pattern.

11. The method of claim 1, wherein the configuration information includes a first dedicated configuration for the first slot pattern that is specific to the UE, and wherein the first UL slot corresponds to a first UL slot indication made in the first dedicated configuration.

12. The method of claim 11, wherein the configuration information includes a second dedicated configuration for a second slot pattern of the slot configuration, and wherein a second UL slot of the plurality of semi-persistently configured UL slots corresponds to a second UL slot indication made in the second dedicated configuration.

13. The method of claim 1, wherein the first slot pattern is further determined using first slot format indication (SFI) downlink control information (DCI) received from the base station, and wherein the first UL slot corresponds to a first UL slot indication made in the first SFI DCI.

14. The method of claim 13, wherein a second slot pattern of the slot configuration is determined using second SFI DCI received from the base station, and wherein a second UL slot of the plurality of semi-persistently configured UL slots corresponds to a second UL slot indication made in the second SFI DCI.

15. The method of claim 1, wherein the plurality of semi-persistently configured UL slots does not include a UL slot corresponding to a UL slot indication made by dynamic downlink control information (DCI).

16. The method of claim 1, wherein the UL gap length is indicated to the UE by the base station.

17. An apparatus of a user equipment (UE) to perform time division duplex (TDD) communication with a base station, comprising:
   one or more processors; and
   a memory storing instructions that, when executed by the one or more processors, cause the one or more processors to configure the UE to:
      determine, using configuration information from the base station, a first slot pattern of a slot configuration used during the TDD communication;
      determine an uplink (UL) gap periodicity, wherein a period of the UL gap periodicity comprises repetitions of the slot configuration during the TDD communication; and
      perform UE calibration during a plurality of semi-persistently configured UL slots of the period, wherein a number of the plurality of semi-persistently configured UL slots is equal to a UL gap length, and wherein a first UL slot of the plurality of semi-persistently configured UL slots corresponds to the first slot pattern.

18. The apparatus of claim 17, wherein the plurality of semi-persistently configured UL slots are initial semi-persistently configured UL slots of the period.

19. The apparatus of claim 17, wherein the plurality of semi-persistently configured UL slots are initial semi-persistently configured UL slots of the repetitions of the slot configuration.

20. The apparatus of claim 17, wherein the instructions, when executed by the one or more processors, further cause the one or more processors to configure the UE to determine, using the configuration information, a second slot pattern of the slot configuration, wherein a second UL slot of the plurality of semi-persistently configured UL slots corresponds to the second slot pattern.

* * * * *